(12) United States Patent
Yamazaki et al.

(10) Patent No.: US 11,063,757 B2
(45) Date of Patent: Jul. 13, 2021

(54) SETTING INFORMATION UTILIZATION SYSTEM AND SETTING INFORMATION UTILIZATION METHOD

(71) Applicants: Masataka Yamazaki, Kanagawa (JP); Yoh Masuyama, Kanagawa (JP)

(72) Inventors: Masataka Yamazaki, Kanagawa (JP); Yoh Masuyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 274 days.

(21) Appl. No.: 15/994,053

(22) Filed: May 31, 2018

(65) Prior Publication Data

US 2018/0351742 A1 Dec. 6, 2018

(30) Foreign Application Priority Data

Jun. 1, 2017 (JP) .............................. JP2017-109501

(51) Int. Cl.
*H04L 9/08* (2006.01)
*H04L 29/06* (2006.01)

(52) U.S. Cl.
CPC .......... *H04L 9/0897* (2013.01); *H04L 9/0861* (2013.01); *H04L 9/0866* (2013.01);
(Continued)

(58) Field of Classification Search
CPC ... H04L 9/0897; H04L 9/0894; H04L 63/061; H04L 9/0866; H04L 63/0428; H04L 63/0478; H04L 9/0861
(Continued)

(56) References Cited

U.S. PATENT DOCUMENTS

2001/0012411 A1   8/2001   Miyazaki et al.
2002/0030853 A1   3/2002   Kizaki et al.
(Continued)

FOREIGN PATENT DOCUMENTS

JP   2013-131168   7/2013
JP   2014-204152   10/2014
JP   2014-217996   11/2014

*Primary Examiner* — Mohammad W Reza
(74) *Attorney, Agent, or Firm* — Harness, Dickey & Pierce, P.L.C.

(57) ABSTRACT

Embodiments of the present invention include a system for utilizing setting information, including a first electronic device and a second electronic device communicably connected to an information processing apparatus via a network. The first electronic device includes first circuitry to: obtain, from a first memory, setting information relating to setting of the first electronic device; accept selection of a saving destination of the setting information; encrypt the setting information in an encryption method determined in accordance with the saving destination; and store the encrypted setting information in the saving destination. The second electronic device includes second circuitry to: obtain the encrypted setting information from the saving destination; accept selection of the saving destination of the encrypted setting information; decrypt the encrypted setting information in a decryption method corresponding to the encryption method determined in accordance with the saving destination; and store the decrypted setting information in a second memory.

19 Claims, 29 Drawing Sheets

(52) U.S. Cl.
CPC ........ *H04L 9/0894* (2013.01); *H04L 63/0428* (2013.01); *H04L 63/0478* (2013.01); *H04L 63/061* (2013.01)

(58) Field of Classification Search
USPC ......................................................... 713/189
See application file for complete search history.

(56) References Cited

U.S. PATENT DOCUMENTS

| | | | | |
|---|---|---|---|---|
| 2003/0212889 | A1* | 11/2003 | Khieu | H04L 41/28 713/164 |
| 2004/0268086 | A1 | 12/2004 | Masuyama et al. | |
| 2005/0179931 | A1 | 8/2005 | Yamaguchi et al. | |
| 2007/0160199 | A1* | 7/2007 | Sekiguchi | G06F 21/10 380/28 |
| 2010/0131753 | A1* | 5/2010 | Ha | H04L 63/0428 713/153 |
| 2010/0142707 | A1* | 6/2010 | Han | H04L 63/0428 380/255 |
| 2010/0306760 | A1* | 12/2010 | Mulligan | G06F 9/44505 717/174 |
| 2011/0037992 | A1* | 2/2011 | Kato | G03G 15/50 358/1.13 |
| 2011/0055356 | A1* | 3/2011 | Nonaka | G06F 21/608 709/219 |
| 2013/0128313 | A1 | 5/2013 | Hirokawa et al. | |
| 2014/0082747 | A1 | 3/2014 | Negoro et al. | |
| 2014/0149976 | A1 | 5/2014 | Yagiura et al. | |
| 2014/0156053 | A1* | 6/2014 | Mahdavi | G06Q 50/04 700/119 |
| 2014/0325199 | A1 | 10/2014 | Iwasa et al. | |
| 2014/0365757 | A1 | 12/2014 | Masuyama et al. | |
| 2016/0274919 | A1 | 9/2016 | Masuyama et al. | |
| 2017/0132015 | A1 | 5/2017 | Iwasa et al. | |
| 2017/0310841 | A1 | 10/2017 | Shibukawa et al. | |
| 2017/0359315 | A1* | 12/2017 | Zhang | B29C 64/386 |
| 2018/0084127 | A1 | 3/2018 | Yamazaki et al. | |
| 2018/0095683 | A1* | 4/2018 | Okada | H04L 9/32 |

* cited by examiner

FIG. 14A
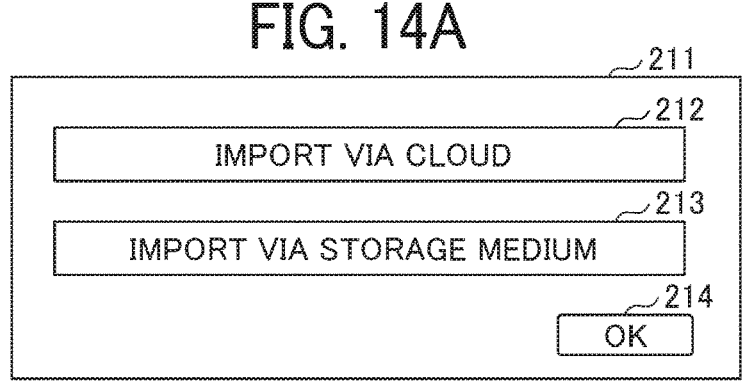
FIG. 14B
A COMPANY HUMAN RESOURCES DIVISION
COMMENT
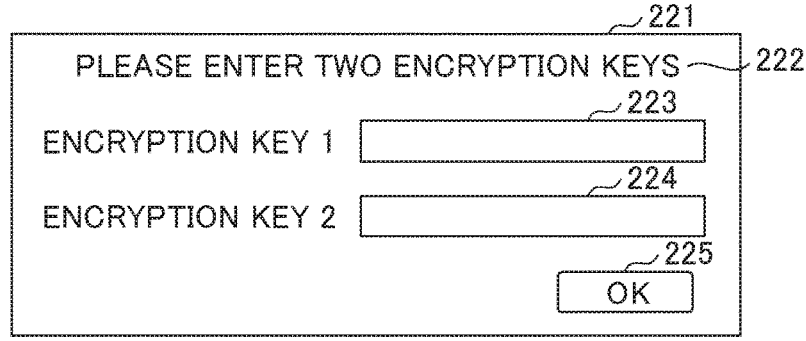
A COMPANY INTELLECTUAL PROPERTY DIVISION
FIG. 14C
```
                                                    ,221
    PLEASE ENTER TWO ENCRYPTION KEYS —222
                                        ,223
    ENCRYPTION KEY 1  [            ]
                                        ,224
    ENCRYPTION KEY 2  [            ]
                                        ,225
                                       [ OK ]
```
FIG. 14D
```
                                                    ,231
                                    ,232
    PLEASE INSERT STORAGE MEDIUM
        AND PRESS OK BUTTON
                                       ,233
                                      [ OK ]
```
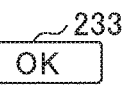

FIG. 14E
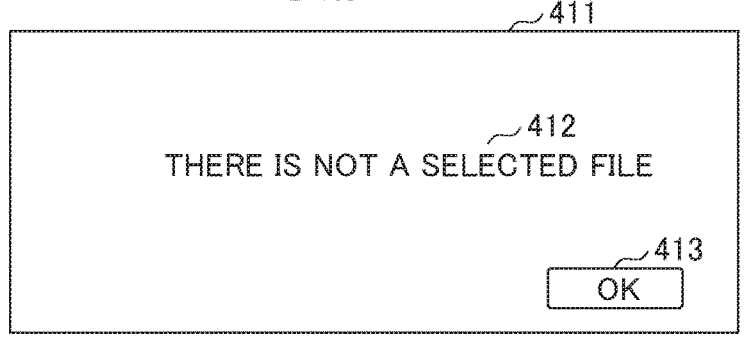
FIG. 14F
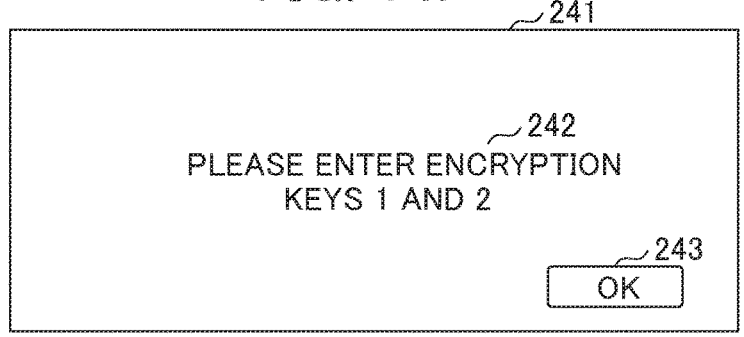
FIG. 14G
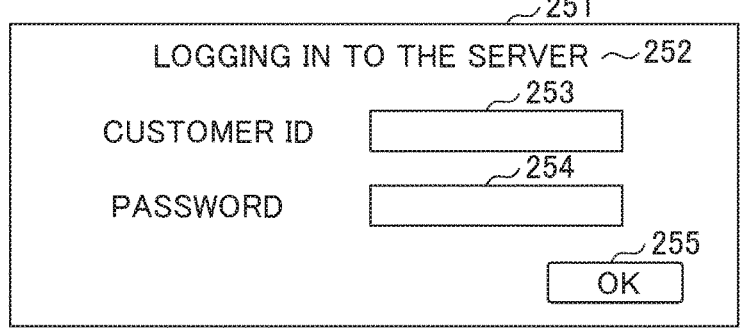
FIG. 14H

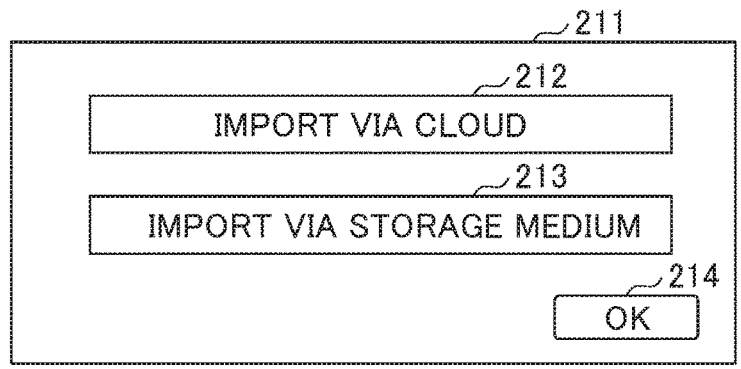

SETTING INFORMATION UTILIZATION SYSTEM AND SETTING INFORMATION UTILIZATION METHOD

CROSS-REFERENCE TO RELATED APPLICATIONS

This patent application is based on and claims priority pursuant to 35 U.S.C. § 119(a) to Japanese Patent Application No. 2017-109501, filed on Jun. 1, 2017, in the Japan Patent Office, the entire disclosure of which is hereby incorporated by reference herein.

BACKGROUND

Technical Field

The present invention relates to a setting information utilization system and a setting information utilization method.

Description of the Related Art

In an office, etc., an electronic device in general such as a printer is used, and such an electronic device can be customized in consideration of convenience for a user. Setting items of an electronic device that a user can set when customizing the electronic device tends to increase with addition or improvement of functions of the electronic device. Furthermore, there may be a setting item that is set by a person who is familiar with electronic devices, such as a customer engineer (CE).

Even electronic devices, such as printers, released by the same manufacturer have variety of models. There is a chance of updating an electronic device that has already been in use or a chance where a user additionally purchases a new electronic device. In such cases, it is preferable that a new electronic device can be used in the same manner but it takes time for a user, etc., to customize all setting items at the time of installing the new electronic device.

SUMMARY

Embodiments of the present invention include a system for utilizing setting information, including a first electronic device and a second electronic device communicably connected to an information processing apparatus via a network. The first electronic device includes first circuitry to: obtain, from a first memory, setting information relating to setting of the first electronic device; accept selection of a saving destination of the setting information; encrypt the setting information in an encryption method determined in accordance with the saving destination; and store the encrypted setting information in the saving destination. The second electronic device includes second circuitry to: obtain the encrypted setting information from the saving destination; accept selection of the saving destination of the encrypted setting information; decrypt the encrypted setting information in a decryption method corresponding to the encryption method determined in accordance with the saving destination; and store the decrypted setting information in a second memory.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14A is a diagram illustrating an example of a screen that the second electronic device displays on a control panel according to an embodiment of the present invention at the time of import;

FIG. 14B is a diagram illustrating an example of a screen that the second electronic device displays on the control panel at the time of import;

FIG. 14C is a diagram illustrating an example of a screen that the second electronic device displays on the control panel at the time of import;

FIG. 14D is a diagram illustrating an example of a screen that the second electronic device displays on the control panel at the time of import;

FIG. 14E is a diagram illustrating an example of a screen that the second electronic device displays on the control panel at the time of import;

FIG. 14F is a diagram illustrating an example of a screen that the second electronic device displays on the control panel at the time of import;

FIG. 14G is a diagram illustrating an example of a screen that the second electronic device displays on the control panel at the time of import;

FIG. 14H is a diagram illustrating an example of a screen that the second electronic device displays on the control panel at the time of import;

FIG. 21A is a diagram illustrating an example of a screen that the second electronic device displays on the control panel at the time of import, according to the second embodiment;

FIG. 21B is a diagram illustrating an example of a screen that the second electronic device displays on the control panel at the time of import, according to the second embodiment;

FIG. 21C is a diagram illustrating an example of a screen that the second electronic device displays on the control panel at the time of import, according to the second embodiment;

Figure 1:
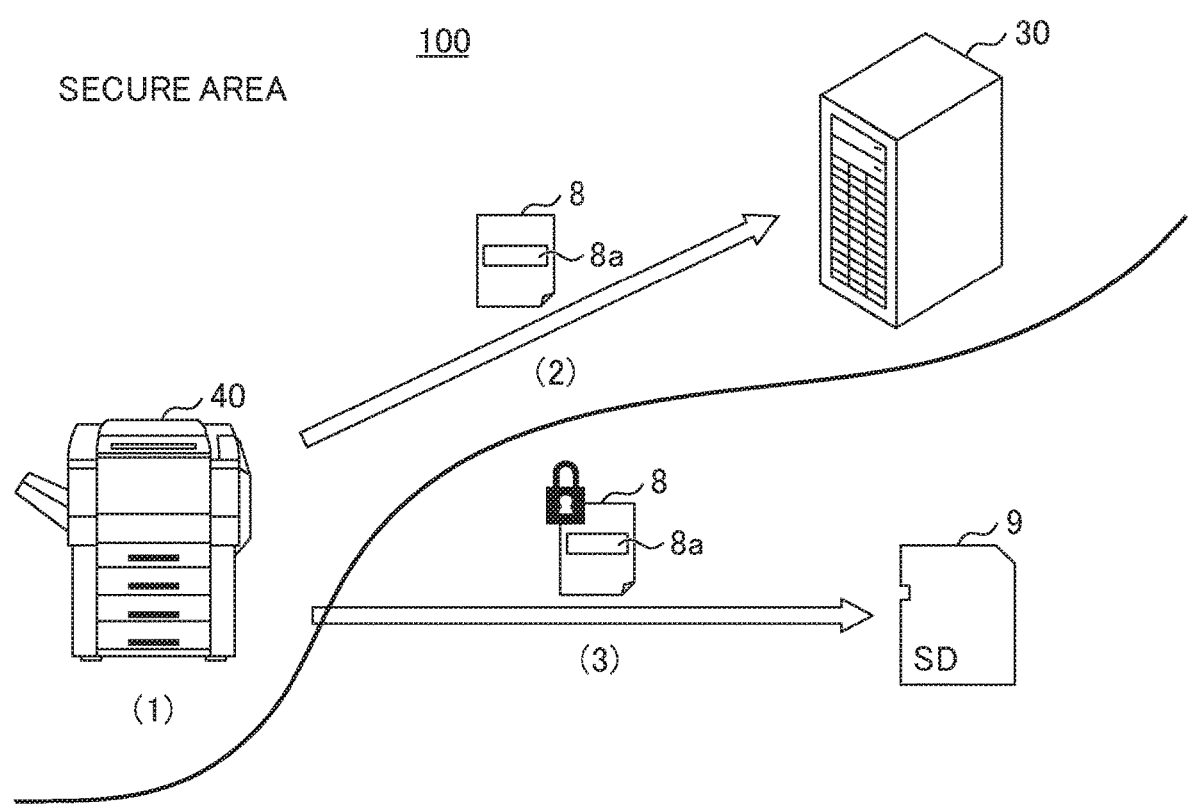
FIG. 1 is an example of a diagram for explaining an overview of an operation of a setting information utilization system according to an embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

In a case where a user additionally purchases a new electronic device, it takes time for a user, etc., to customize all setting items at the time of installing the new electronic device. In view of the above, there has been a technique to assist in setting of setting information from an electronic device that has already been in use (hereinafter referred to as a first electronic device) to another electronic device (hereinafter referred to as a second electronic device). For example, there is a technique in which a first electronic device exports setting information to a server and a second electronic device imports setting information from the server.

However, there may be some cases in which export to a server is difficult. For example, the following cases should be considered. First, there is a case in which a first electronic device or a second electronic device is installed in a network environment where an enough communication band is not ensured. Moreover, there is a case in which keeping setting information in a server on the Internet is prohibited according to company regulations, etc. In such situations as above, adoption of a technique in which a CE or a user exports setting information of a first electronic device to a portable storage medium and imports the setting information from the portable storage medium to a second electronic device may be considered.

Additionally, in order to prevent information from leaking, setting information is often encrypted when being exported to a server. Furthermore, a saving destination, in which setting information is saved, is different in each of the case where a first electronic device exports the setting information to a server and the case where a first electronic device exports the setting information to a portable storage medium. Therefore, proper encryption methods for setting information should be different in each case. However, it has not been considered to change encryption methods in accordance with saving destinations of setting information.

In consideration of the above, a setting information utilization system according to one or more embodiments described below allows to change encryption methods in accordance with saving destinations of setting information.

First Embodiment

<Overview of the Setting Information Utilization System>

FIG. 1 is an example of a diagram for explaining an overview of an operation in the setting information utilization system according to the present embodiment. As illustrated in the diagram, an electronic device 40 transmits obtained setting information 8 to a server 30 or stores the obtained setting information 8 in a storage medium 9. Here, the server 30 and the electronic device 40 are maintained to be secure. In this disclosure, to be secure means to be in a state where data, a communication path, etc., are protected by use of cryptograph, protection software, etc., so as to eliminate danger of an external attack, invasion, eavesdropping, defacing, etc.

(1) When exporting the setting information 8, a customer engineer (CE) or a user determines whether to transmit the setting information 8 to the server 30 or to store the setting information 8 in the storage medium 9, in consideration of the situation where the electronic device 40 is installed.

(2) In a case where a CE or a user selects to transmit the setting information 8 to the server 30, the electronic device 40 may only encrypt highly confidential information 8a in the setting information 8. There are various types of highly confidential information 8a, such as a password of an administrator and an address book. It is possible that all of the setting information 8 is encrypted. However, in consideration of a case where a CE or a user desires to view or edit the setting information 8 when the setting information 8 is transmitted to the server 30, it is preferable that only highly confidential information 8a is encrypted. In addition, even though the electronic device 40 does not encrypt the entirety of the setting information 8, communication paths are protected by HTTPs communication, and furthermore, the server 30 is maintained to be secure. Therefore, safety is maintained to a predetermined extent even without encryption of the entirety of the setting information 8.

(3) In a case where a CE or a user selects to store the setting information 8 in the storage medium 9, the electronic device 40 may only encrypt highly confidential information 8a in the setting information 8 and further encrypt the entirety of the setting information 8. That is to say, the highly confidential information 8a in the setting information 8 is doubly encrypted and the entirety of the setting information 8 is encrypted as well, so as to keep the storage medium 9, which is not secure, as safe as the server 30. It should be noted that, even in a case where the setting information 8 is stored in the storage medium 9, the setting information 8 is converted (i.e., conversion from a format for the first electronic device to a format for the second electronic device) in the server 30. Therefore, in a case where the entirety of the setting information 8 is merely encrypted while the highly confidential information 8a is not encrypted, the highly confidential information 8a is in plaintext at the time of conversion in the server 30. Therefore, in terms of the above aspect, double encryption is effective.

As described above, in the setting information utilization system 100 according to the present invention, the encryption method changes in accordance with whether the saving destination of setting information 8 is a server 30 or a storage medium 9. Therefore, regardless of whether setting information 8 exists in a server 30 or in a storage medium 9, safety of setting information 8 is maintained. It should be noted that, needless to say, a new electronic device 40 decrypts setting information 8 in a decryption method that is different in accordance with encryption methods.

In this disclosure, setting information 8 is each type of information set in an electronic device 40 or used by an electronic device 40. Alternatively, setting information 8 may also be referred to as information that is able to be set externally to change the behavior of an electronic device 40. It may be considered that setting information 8 is used by a program in some way, although setting information 8 may be setting data that has nothing to do with a program. A specific example is illustrated in Table 1.

By a different encryption method, it means that strength (i.e., difficulty in decoding) of encryption is different. Different encryption methods may have different encryption algorithms. Further, different encryption methods may have the same algorithm and be encrypted a different number of times. The same is true for different decryption.

<Example of a System Configuration>

Figure 2:
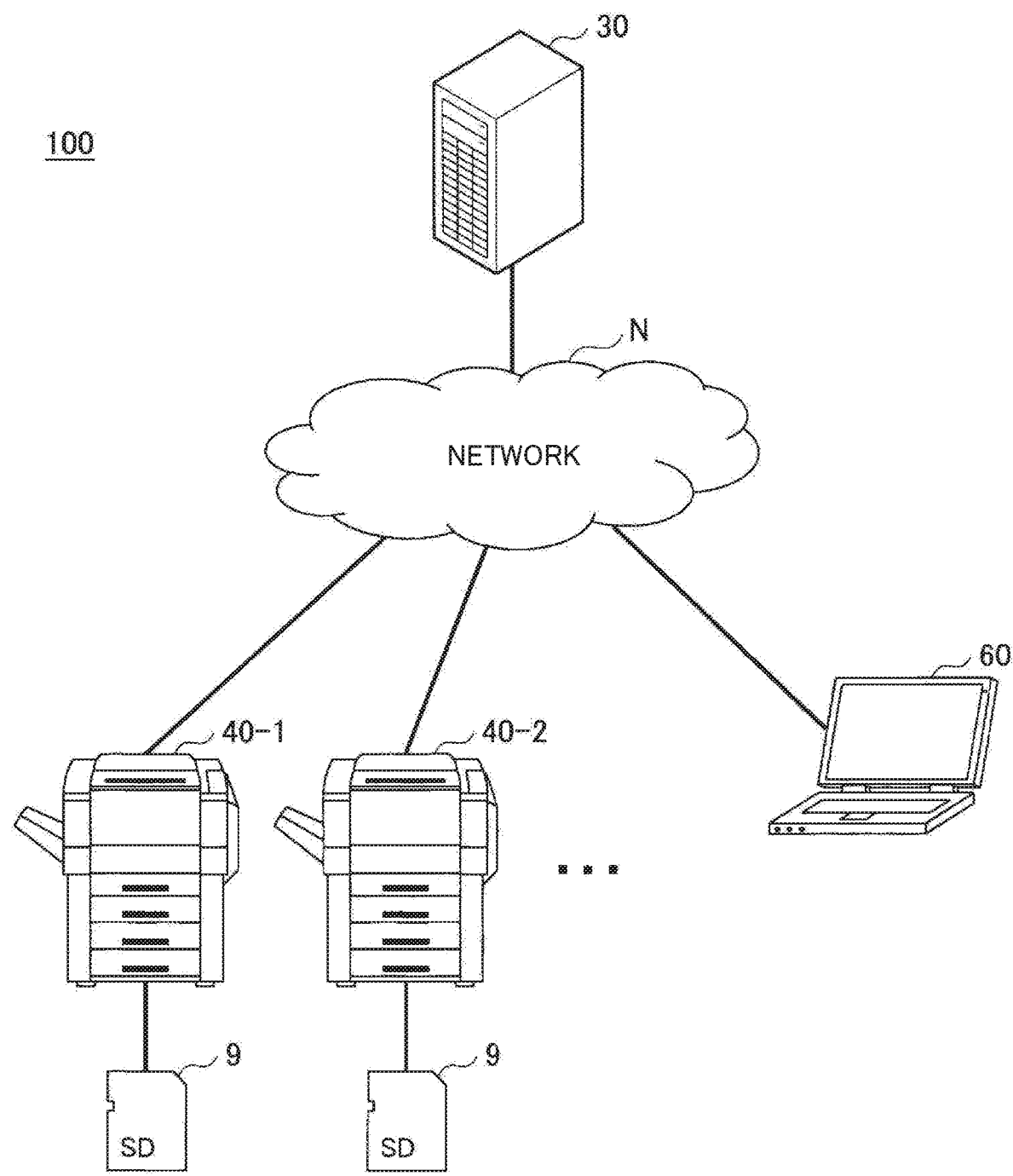
FIG. 2 is an example of a diagram illustrating an overview of a configuration of the setting information utilization system.

FIG. 2 is an example of a diagram illustrating an overview of a configuration of the setting information utilization system 100. The setting information utilization system 100 includes multiple electronic devices 40, a server 30, and a setting terminal 60, which are coupled via a network N. In the following description, an electronic device 40 from which setting information 8 is exported is referred to as a first electronic device 40-1 and an electronic device 40 to which setting information 8 is imported is referred to as a second electronic device 40-2. To a first electronic device 40-1 and a second electronic device 40-2, a portable storage medium 9 may be inserted.

The first electronic device 40-1 is an electronic device 40 in which setting information 8 has already been set to a setting item. The second electronic device 40-2 is an electronic device 40 to which setting information 8 of an existing electronic device is projected to be set. In many cases, the second electronic device 40-2 is a newly purchased electronic device 40, although the second electronic device 40-2 may be implemented as an electronic device 40 to which setting information 8 of the first electronic device 40-1 is projected to be set. The embodiments of the present invention are applicable to a case in which a first electronic device 40-1 is replaced with a second electronic device 40-2 or to a case in which a second electronic device 40-2 is added while a first electronic device 40-1 is still in use.

The user may be allowed to customize a first electronic device 40-1 and a second electronic device 40-2 for more convenient use. To customize means to change default settings as desired by a user for the user's convenience. In other words, an electronic device 40 may be a device that operates with setting information 8 that can be changed by a user. However, as described below, setting information 8 is not limited to be information set by a user and may be information set by a CE, information managed by application, information relating to an engine for, for example, a print function, etc.

Specific examples of a first electronic device 40-1 and a second electronic device 40-2 are multifunction peripherals, projectors, electronic blackboards, teleconference terminals, etc., although the first electronic device 40-1 and the second electronic device 40-2 are not limited to the examples.

A multifunction peripheral provides multiple functions such as a printer, a scanner, and a function of sending/receiving a facsimile. A copy function may be achieved by use of a printer and a scanner. Further, an image may be transmitted by use of a scanner and a function of sending a facsimile. Further, an image may be received and printed by use of a function of receiving a facsimile and a printer. A multifunction peripheral may be referred to as an image forming apparatus, an image processing apparatus, a printer device, a copy machine, or an MFP.

A projector is a projection device that projects an image. Alternatively, a projector may be referred to as a cinematographic machine. An electronic blackboard detects coordinates pointed by a pointer such as an electronic pen or a finger and displays a stroke, which is made by connecting coordinates, on a display. An electronic blackboard may be referred to as an electronic information board, an electronic white board, etc. A teleconference terminal transmits and receives image data and audio data between different locations. Further, a teleconference terminal displays an image on a display and outputs audio from a speaker, so as to enable a participant who uses the teleconference terminal to have a teleconference.

Moreover, an electronic device 40 may be a device whose setting information 8 is customized, such as a digital signage, a digital camera, or a drone.

The network N is constituted by a LAN (local area network) laid at a place where an electronic device 40 is installed, a provider network of a provider that connects a LAN to the Internet, a line provided by a line provider, etc. In a case where the network N includes multiple LANs, the network N may be referred to as a wide area network (WAN). Furthermore, the Internet, in which computers are connected in a worldwide level and networks over the world are mutually connected, is included.

The network N may be constituted in a wired or wireless form. Further, the network N may be constituted in combination of a wired form and a wireless form. Furthermore, in a case where an electronic device 40 is directly coupled to a public line network, the electronic device 40 may become coupled to a provider network without being mediated by a LAN. In a case of becoming coupled wirelessly, a communication standard such as Wi-Fi (registered trademark), Bluetooth (registered trademark), 3G 4G, LTE, etc., may be utilized, as appropriate.

The setting terminal 60 is utilized for designating an information processing apparatus as a first electronic device 40-1 or a second electronic device 40-2, or for viewing setting information 8 transmitted from a first electronic device 40-1 to the server 30, etc. Furthermore, the setting terminal 60 is utilized by a CE for transmitting setting information 8 in a storage medium 9 to the server 30 or for receiving converted setting information 8 from the server 30. Conversion is performed to convert setting information 8 in a format for a first electronic device 40-1 to setting information 8 in a proper format for a second electronic device 40-2. As for the setting terminal 60, it is only required that browser software or an equivalent application operates on the setting terminal 60. The setting terminal 60 may be, for example, a personal computer (PC), a smartphone, a tablet terminal, a cellular phone, a personal data assistant (PDA), a game machine, a car navigation, etc., although the setting terminal 60 is not limited to the examples.

The server 30 is an information processing apparatus for converting setting information 8 for a first electronic device 40-1 to setting information 8 for a second electronic device 40-2. Here, it is assumed that any desired conversion methods may be utilized. It should be noted that, preferably, the server 30 is compatible with cloud computing. Cloud computing is a form of utilizing resources on a network while a specific hardware resource is not recognized.

<An Example of a Hardware Configuration>
<<Electronic Device>>

Figure 3:
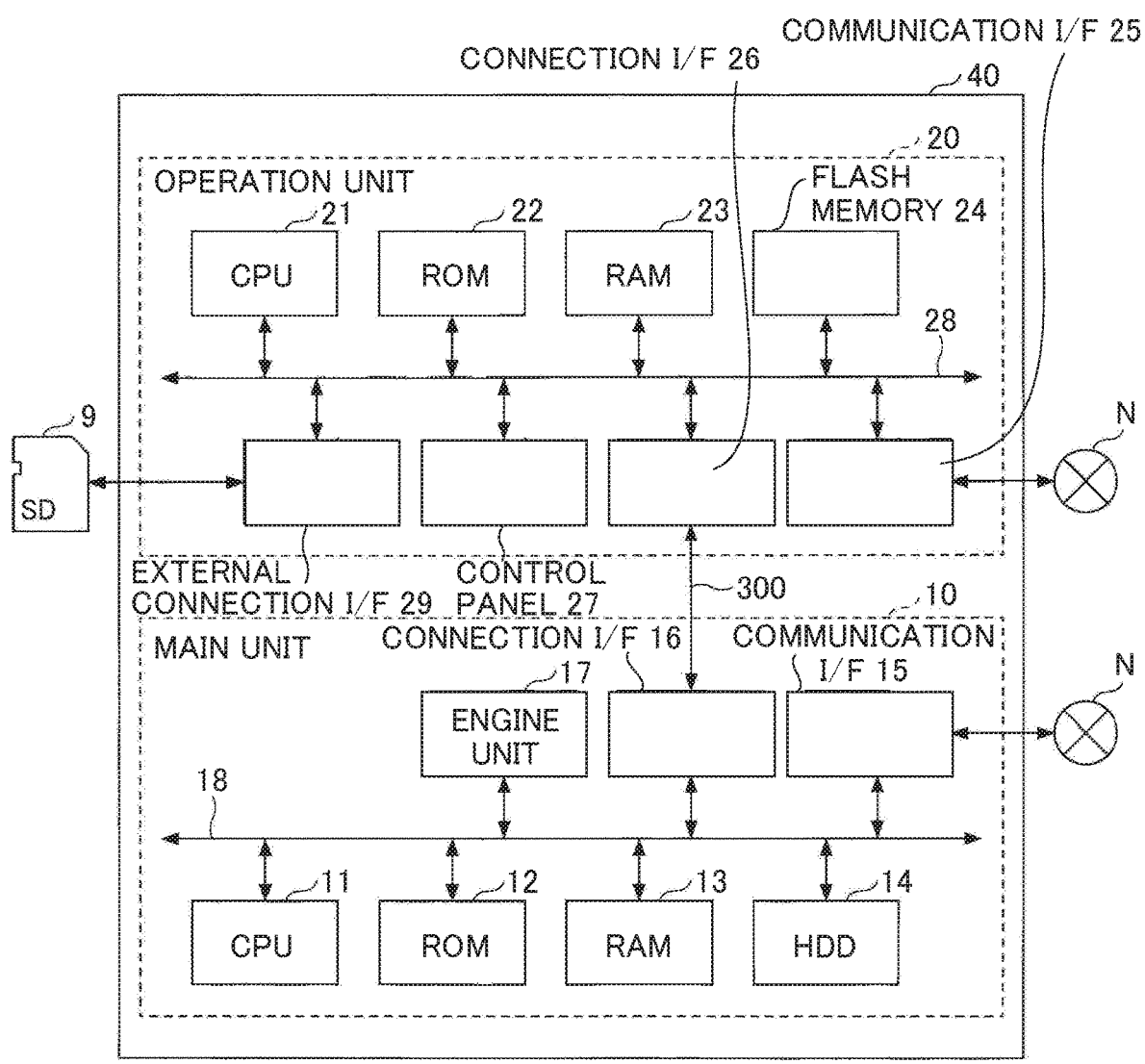
FIG. 3 is a diagram illustrating an example of a hardware configuration of an electronic device according to an embodiment of the present invention.

FIG. 3 is a diagram illustrating an example of a hardware configuration of an electronic device. As illustrated in FIG. 3, an electronic device 40 is provided with a main unit 10 and an operation unit 20. The main unit 10 and the operation unit 20 are coupled via a designated communication path 300, so as to be able to mutually communicate. For the communication path 300, one with Universal Serial Bus (USB) standard may be utilized, for example. However, the communication path 300 may be one with another standard, regardless of being wired or wireless.

It should be noted that the main unit 10 is able to perform an operation in accordance with a manipulation accepted by the operation unit 20. Furthermore, the main unit 10 is able to communicate with an external device such as a client PC and is able to perform an operation in accordance with an instruction received from an external device.

Next, a hardware configuration of the main unit 10 is explained. As illustrated in FIG. 3, the main unit 10 includes a central processing unit (CPU) 11, a read only memory (ROM) 12, a random-access memory (RAM) 13, a hard disk drive (HDD) 14, a communication interface (I/F) 15, a connection I/F 16, and an engine unit 17, which are mutually connected via a system bus 18. For convenience of explanation, a configuration in which the main unit 10 includes an HDD 14 is explained in the example of FIG. 3. However, for example, there may be a configuration without an HDD 14, in which an enough storage area is not ensured.

The CPU 11 controls an overall operation of the main unit 10. The CPU 11 utilizes the RAM 13 as a work area and executes a program stored in the ROM 12 or the HDD 14, etc., so as to entirely control an operation of the main unit 10 and achieve various functions described above such as a copy function, a scanner function, a facsimile function, and a printer function.

The communication I/F 15 is an interface for connection to the network N. The connection I/F 16 is an interface for communication with the operation unit 20 via the communication path 300.

The engine unit 17 is a hardware that performs general information processing and processing except for communication, so as to achieve a copy function, a scanner function, a facsimile function, and a printer. For example, the engine unit 17 includes: a scanner (i.e., an image reading unit) that scans an image of a document; a plotter (i.e., an image forming unit) that performs printing onto a sheet material such as paper; and a facsimile unit that performs facsimile communication. Furthermore, the engine unit 17 may include a specific option such as a finisher for sorting printed materials or an automatic document feeder (ADF) for automatically feeding documents.

Next, a hardware configuration of the operation unit 20 is explained. As illustrated in FIG. 3, the operation unit 20 includes a CPU 21, a ROM 22, a RAM 23, a flash memory 24, a communication I/F 25, a connection I/F 26, a control panel 27, and an external connection I/F 29, which are mutually connected via a system bus 28. For convenience of explanation, a configuration in which the operation unit 20 includes a flash memory 24 is explained in the example of FIG. 3. However, for example, there may be a configuration without a flash memory 24. That is to say, there may be a configuration in which an electronic device 40 does not include a storage device for storing received contents.

The storage medium 9 is a non-volatile storage device. As described above, it is preferable that the storage medium 9 is removable and portable. For example, the storage medium 9 may be an SD memory card (registered trademark), a USB memory, a compact flash (registered trademark), an HDD, a solid state drive (SSD), etc. The storage medium 9 may be any desired storage medium as long as it is possible for a first electronic device 40-1 or a second electronic device 40-2 to write information onto or read information from the storage medium.

<<Server>>

Figure 4:
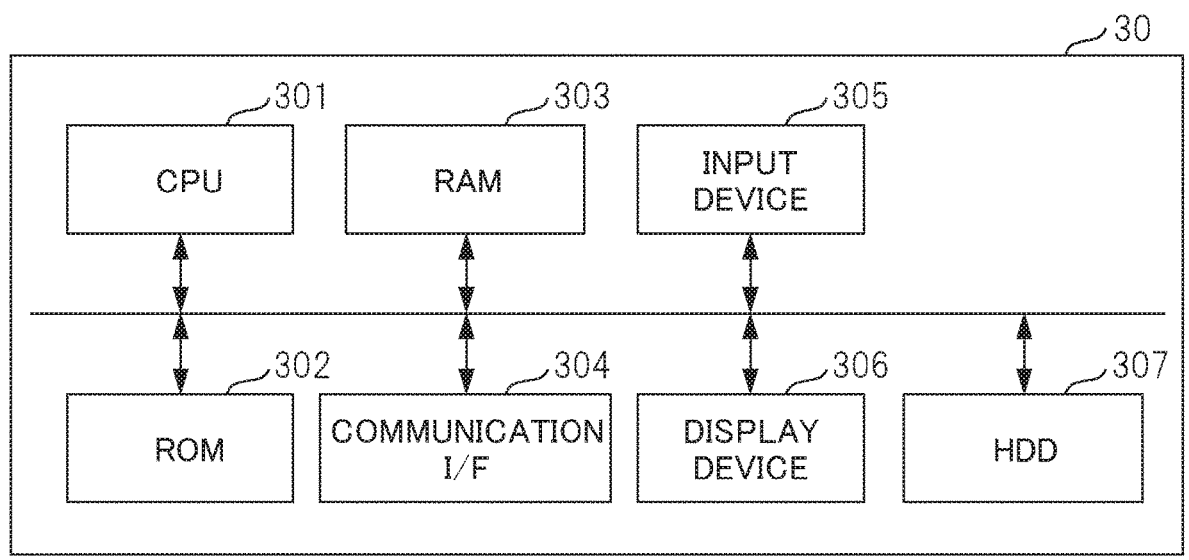
FIG. 4 is an example of a hardware configuration diagram of a server according to an embodiment of the present invention.

FIG. 4 is an example of a hardware configuration diagram of a server 30. The server 30 includes a CPU 301, a ROM 302, a RAM 303, a communication I/F 304, an input device 305, a display device 306, and a hard disk device (HDD) 307. The CPU 301 controls an overall operation of the server 30. The ROM 302 is a non-volatile memory that stores various types of data such as a program. The RAM 303 is a volatile memory that functions as a work area for various types of processing performed by the CPU 301. The communication L/F 304 is an interface for connection to the network N. The input device 305 is a device used by an operator for input of manipulation. For example, the input device 305 is configured with a mouse, keyboard, etc. The display device 306 is a device that displays various types of information. For example, the display device 306 is configured with a liquid crystal display device, etc.

The hardware configuration of a setting terminal 60 may be the same as the server 30 or may be one that is different from the server 30 to an extent that does not cause a problem for explanation of the present embodiment.

As described above, it is preferable that the server 30 is compatible with cloud computing. Therefore, it is not necessary that the illustrated hardware configuration is accommodated in a single casing or is provided as a single device. That is to say, the hardware elements that are preferably provided to the server 30 are illustrated. Furthermore, to be compatible with cloud computing, the physical configuration of the server 30 of the present embodiment may not be fixed. That is to say, the server 30 may be configured such that hardware resources are dynamically connected or disconnected in accordance with the load.

<Functions>

Figure 5:
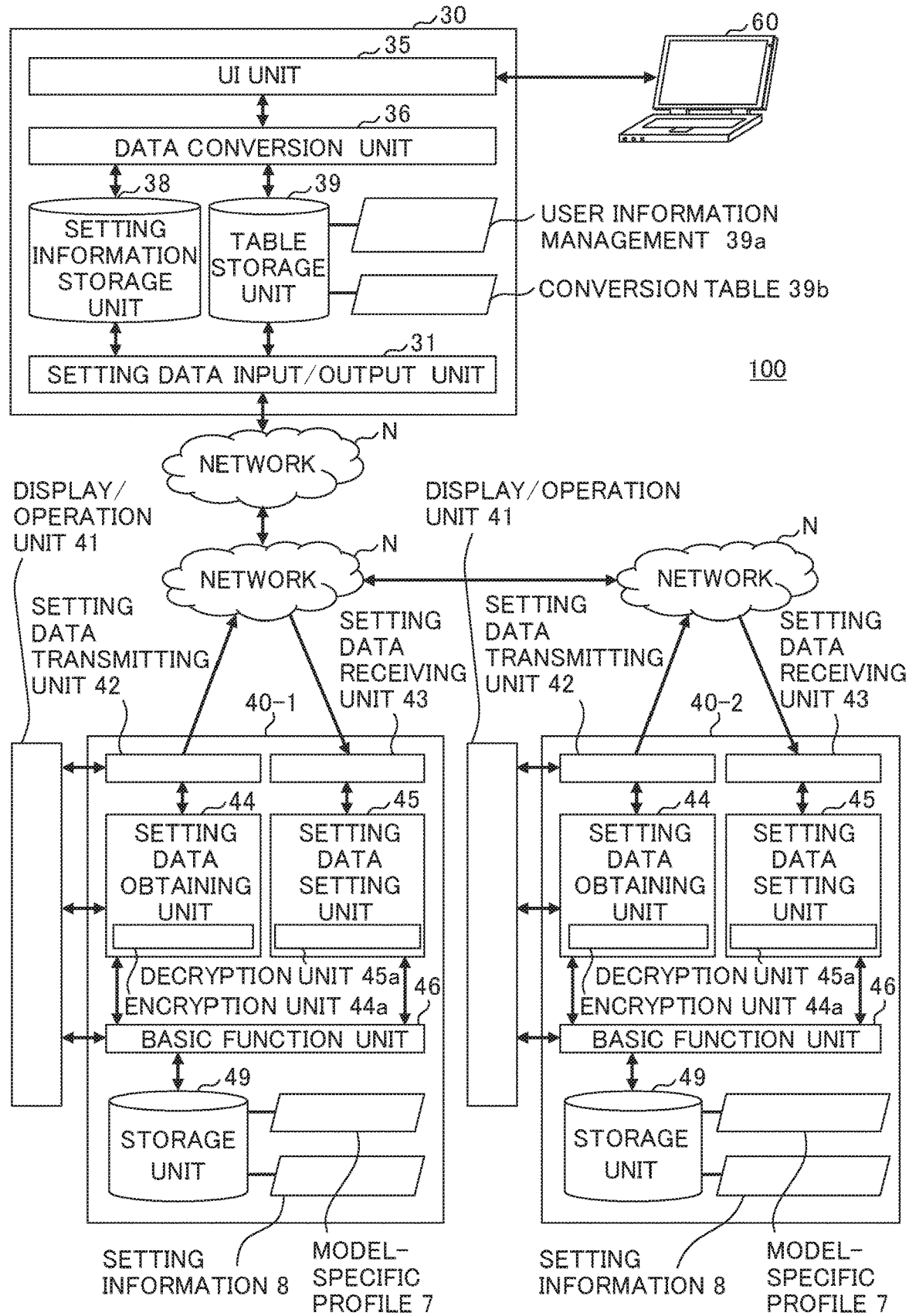
FIG. 5 is an example of a functional block diagram of the setting information utilization system, for explaining functions of the electronic device and the server using blocks.

FIG. 5 is an example of a functional block diagram of the setting information utilization system 100, which is for explaining functions of electronic devices 40 and the server 30 using blocks. In FIG. 5, a functional block diagram in a case where an electronic device 40 transmits setting information 8 to the server 30 is illustrated.

The functions of the first electronic device 40-1 and the second electronic device 40-2 may be the same or may be different to an extent that does not cause a problem for explanation of the present embodiment. For the above reason, the first electronic device 40-1 is mainly explained.

<<First Electronic Device 40-1 and Second Electronic Device 40-2>>

The first electronic device 40-1 includes a display/operation unit 41, a setting data transmitting unit 42, a setting data receiving unit 43, a setting data obtaining unit 44, a setting data setting unit 45, and a basic function unit 46. First, the display/operation unit 41 is implemented mainly by the operation unit 20. The display/operation unit 41 is a function that is implemented when any one of the configuration elements illustrated in FIG. 3 operates on the basis of an instruction from the CPU 21 in accordance with a program retrieved from the flash memory 24 onto the RAM 23. Such a program as described above is delivered from a server for delivering programs or is stored in a storage medium for distribution.

In addition, each of the setting data transmitting unit 42, the setting data receiving unit 43, the setting data obtaining unit 44, the setting data setting unit 45, and the basic function unit 46 is a function that is implemented when any one of the configuration elements illustrated in FIG. 3 operates on the basis of an instruction from the CPU 11 in accordance with a program retrieved from the HDD 14 onto the RAM 13. Such a program as described above is delivered from a server for delivering programs or is stored in the storage medium 9 for distribution. It should be noted that the above functions may be provided by the main unit 10 or the operation unit 20.

The display/operation unit 41 displays various types of screens on the control panel 27 and accepts operation by a CE or a user, etc.

The basic function unit 46 is a basic function provided to the first electronic device 40-1. In a case where the first electronic device 40-1 is a multifunction peripheral, functions such as printing, reading a document, and transmitting/receiving a facsimile are provided. Furthermore, the basic function unit 46 obtains setting information 8 from a storage unit 49 and writes setting information 8, based on a model-specific profile 7. The basic function unit 46 is implemented when the CPU 11 executes a program to control the engine unit 17, etc.

The setting data obtaining unit 44 obtains setting information 8 from the basic function unit 46. The setting data obtaining unit 44 is a function that is mainly used in the first electronic device 40-1. The setting data obtaining unit 44 is implemented when the CPU 11 executes a program, etc. The setting data obtaining unit 44 includes an encryption unit 44a. The encryption unit 44a encrypts a setting value of a setting item in setting information 8, and the setting value is designated by a model-specific profile 7.

The setting data transmitting unit 42 transmits setting information 8 obtained by the setting data obtaining unit 44 to the server 30 via a network. The setting data transmitting unit 42 is a function that is mainly used in the first electronic device 40-1. The setting data transmitting unit 42 is implemented when the CPU 11 executes a program to control the communication I/F 15, etc.

The setting data receiving unit 43 receives setting information 8 from the server 30 via a network and transmits the setting information 8 to the setting data setting unit 45. The setting data receiving unit 43 is a function that is mainly used in the second electronic device 40-2. The setting data receiving unit 43 is implemented when the CPU 11 executes a program to control the communication I/F 15, etc.

The setting data setting unit 45 transmits setting information 8 received by the setting data receiving unit 43 to the basic function unit 46. The setting data setting unit 45 is a function that is mainly used in the second electronic device 40-2. The setting data setting unit 45 is implemented when the CPU 11 executes a program, etc. The setting data setting unit 45 includes a decryption unit 45a. The decryption unit 45a decrypts a setting value of a setting item in setting information 8, and the setting value is designated by a model-specific profile 7.

Furthermore, the first electronic device 40-1 includes a storage unit 49. The storage unit 49 is any desired memory capable of storing information, and the storage unit 49 is implemented by at least one of the HDD 14, the RAM 13, and the ROM 12 of the main unit 10. In the storage unit 49, a model-specific profile 7, a program, data of a document, log information, etc., are stored, in addition to setting information 8.

TABLE 1

ADDRESS BOOK
PREFERENCE DATA
VOLATILE DATA
SERVICE SETTING DATA

In Table 1, an example of setting information 8 is illustrated. Setting information 8 is categorized into four types: an address book, preference data, volatile data, and service setting data, for example. The address book is information relating to contact information such as a telephone number, a facsimile number or an email address of each user. Preference data is data set by a user. For example, there are many setting items: a print position of a header or a footer such as a page number and date; time of transition to an energy-saving mode; a setting value relating to a method for recording a debag log, etc.; and a setting value for designating an order of preferentially used paper feeding trays, etc. Volatile data is data stored in the RAM 13 or the RAM 23 of an electronic device 40. The volatile data includes binary data as well. Binary data is data except for text data. Unlike text data, which has the same meaning in any devices, binary data is data that has meaning when interpreted by a first electronic device 40-1 (e.g., each application). Service setting data is information relating to an engine for a print function, etc. For example, service setting data may be a setting value that may affect an image quality such as a bias voltage, a print process speed, a thickness setting value, and a fixing temperature. Service setting data includes a setting value that a CE is able to set.

(Table 2)

Model-specific profile 7

| MODULE ID | PREFERENCE ID | OBTAINMENT AVAILABILITY | ENCRYPTION AVAILABILITY |
|---|---|---|---|
| 0x10000005 | 0x00000009 | Y | Y |
| 0x10000005 | 0x0000000A | Y | N |
| 0x10000005 | 0x0000004F | N | N |
| 0x10000005 | 0x0000004C | Y | N |
| . | . | . | . |
| . | . | . | . |
| . | . | . | . |

In Table 2, an example of a model-specific profile 7 is illustrated. The model-specific profile 7 designates obtainment availability and encryption availability for each setting item in setting information 8. In Table 2, a module is a function that is implemented by an electronic device 40. For example, a module may be an application such as a print app, a scanner app, or a facsimile app. Preference is an individual setting item of each module. A module ID is identification information for identifying a module. A preference ID is identification information for identifying preference. ID is an abbreviation of identification, which may also be referred to as an identifier or identification information. ID may be a name, a sign, a text, a numerical value, or combination of at least one of the above, which is used for uniquely distinguishing a specific object out of multiple objects. The same is true of other IDs. As obtainment availability, a setting item that is obtained as setting information 8 is designated. For example, counter information (indicative of the number of pages printed by a first electronic device 40-1 in the past) is not obtained because the counter information is not used in a second electronic device 40-2. Furthermore, a device ID (i.e., identification information of an electronic device 40) is not obtained because, when a device ID is set to a second electronic device 40-2, the second electronic device 40-2 may determine that devices have changed. As encryption availability, whether a setting item designated by a preference ID is encrypted is designated. Setting item to be encrypted is a highly confidential setting item, such as a password (stored in volatile data) of an administrator or an address book.

It should be noted that the model-specific profile 7 as described above may be delivered from the server 30 or may be retrieved by a first electronic device 40-1 from the storage medium 9.

<<Server>>

The server 30 includes a setting data input/output unit 31, a data conversion unit 36, and a user interface (UI) unit 35. Each of the functional units included in the server 30 is a function that is implemented when any one of the configuration elements illustrated in FIG. 4 operates on the basis of an instruction from the CPU 301 in accordance with a program retrieved from an HDD 307 onto the RAM 303. Such a program as described above is delivered from a server for delivering programs or is stored in a storage medium for distribution.

The setting data input/output unit 31 transmits and receives setting information 8 between a first electronic device 40-1 and a second electronic device 40-2. As communication protocol, cryptographic communication such as HTTPs or HTTP 2.0 is utilized. The setting data input/output unit 31 is implemented when the CPU 301 illustrated in FIG. 4 executes a program to control the communication I/F 304.

The data conversion unit 36 utilizes a conversion table 39b stored in a table storage unit 39, so as to convert a format of setting information 8 from a format for a first electronic device 40-1 to a format for a second electronic device 40-2. The conversion table 39b includes information (i.e., a storage location, data length, data type, endianness, etc.) relating to each setting item of the first electronic device 40-1 and the second electronic device 40-2. Furthermore, the conversion table 39b includes information of correspondence relation between each setting item of the first electronic device 40-1 and each setting item of the second electronic device 40-2. Therefore, the data conversion unit 36 utilizes the conversion table 39b to convert setting information 8 of the first electronic device 40-1 such that the setting information 8 complies with the format for the second electronic device 40-2. Setting information 8 of the first electronic device 40-1 is converted from a format that is handled by the first electronic device 40-1 to a common data that does not depend on models, by use of the conversion table 39b, and is associated with a setting item of the second electronic device 40-2. Furthermore, the common data is converted so as to comply with the format for the second electronic device 40-2 by use of the conversion table 39b. The data conversion unit 36 is implemented when the CPU 301 illustrated in FIG. 4 executes a program.

The UI unit 35 provides a function as an HTTP server that communicates with the setting terminal 60 using communication protocol such as HTTPs or HTTP 2.0 and transmits screen information written in HTML, JavaScript (registered trademark), etc., to the setting terminal 60. The UI unit 35 is implemented when the CPU 301 illustrated in FIG. 4 executes a program, etc.

Furthermore, the server 30 includes a setting information storage unit 38 and a table storage unit 39. The setting information storage unit 38 and the table storage unit 39 are any desired memory capable of storing information, which may be implemented by at least one of the HDD 307, the RAM 303, and the ROM 302 of FIG. 4. The setting information storage unit 38 stores setting information 8 transmitted from the first electronic device 40-1 and a setting information management table, which manages the setting information 8. The table storage unit 39 stores a conversion table 39b, a user information management table 39a, etc.

TABLE 3

| DEVICE ID | FILE OF SETTING INFORMATION | TIMESTAMP | COMMENT |
|---|---|---|---|
| 3F55-11111 | .../3F55-11111/setting.cab | 2017/04/18/10:10 | A COMPANY HUMAN RESOURCES DIVISION |
| 3F32-22222 | .../3F32-22222/setting.cab | 2017/04/18/12:35 | A COMPANY INTELLECTUAL PROPERTY DIVISION |
| . | . | . | . |
| . | . | . | . |
| . | . | . | . |

In Table 3, a setting information management table stored in the setting information storage unit 38 is schematically illustrated. The setting information management table may, for example, include items such as a file of setting information, a timestamp, and a comment, which are associated with device ID. Device ID is identification information for identifying an electronic device. A device ID is configured with a model and a model number, so that it can specify a model and a specific device among the same. For example, in a case where a device ID is "3F55-11111", "3F55" is a model and "11111" is a model number. A file of setting information includes a path and a file name of a file in which setting information 8 is stored. A timestamp is date and time when setting information 8 is generated. A comment is information regarding setting information 8, which is used for a CE or a user to manage or identify the setting information 8.

TABLE 4

| CUSTOMER ID | 12345678 |
| PASSWORD | ******* |
| REGISTERED DEVICE | 3F55-11111 3F32-22222 |

In Table 4, an example of the user information management table 39a is illustrated. The user information management table 39a is a table for managing an electronic device 40 used by a customer. In the user information management table 39a, a customer ID, a password, and a registered device are registered, for example. Customer ID is information for the server 30 to identify a customer of an electronic device 40. A password is a password of an administrator, which is referred to when a CE or a user logs in. A registered device is device ID of an electronic device registered by a customer. Therefore, when a CE or a user logs in, a first electronic device 40-1 that has already been in use is revealed at least. After a second electronic device 40-2 is registered, a CE or a user is able to see the second electronic device 40-2. It should be noted that a customer is a company using an electronic device 40, a tenant (i.e., a company or a division in a company) utilizing the server 30, etc.

<Configuration in a Case of Storing in a Storage Medium>

Figure 6:
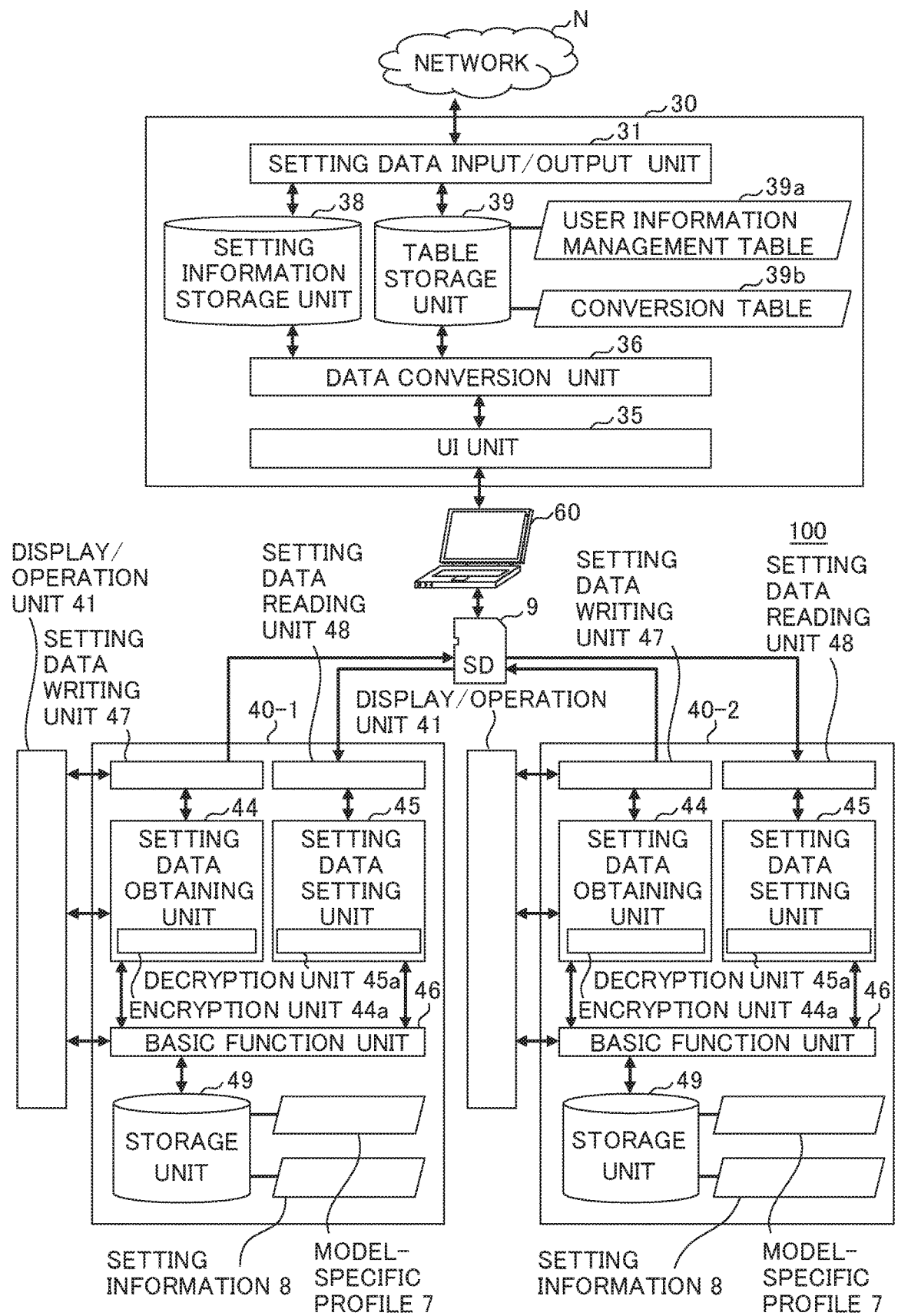
FIG. 6 is an example of a functional block diagram of the setting information utilization system, for explaining functions of the electronic device and the server using blocks.

FIG. 6 is an example of a functional block diagram of the setting information utilization system 100, which is for explaining functions of the electronic devices 40 and the server 30 using blocks. FIG. 6 is a functional block diagram in a case where an electronic device 40 stores setting information 8 in a storage medium 9. In the explanation of FIG. 6, difference from FIG. 5 is mainly explained.

In FIG. 6, each of the first electronic device 40-1 and the second electronic device 40-2 include a setting data writing unit 47 and a setting data reading unit 48. The setting data writing unit 47 writes setting information 8 on the storage medium 9. The setting data writing unit 47 is a function that is mainly used in a first electronic device 40-1. The setting data reading unit 48 reads setting information 8 from the storage medium 9. The setting data reading unit 48 is a function that is mainly used in a second electronic device 40-2. The setting data writing unit 47 and the setting data reading unit 48 are implemented when the CPU 11 executes a program to control the external connection I/F 29, etc.

Furthermore, the encryption unit 44*a* of the setting data obtaining unit 44 encrypts a setting value of a setting item in setting information 8, which is specified by a model-specific profile 7. Further, the encryption unit 44*a* of the setting data obtaining unit 44 encrypts the entirety of the setting information 8. The decryption unit 45*a* of the setting data setting unit 45 decrypts the entirety of the setting information 8. Further, the decryption unit 45*a* of the setting data setting unit 45 decrypts a setting value of a setting item in setting information 8, which is specified by a model-specific profile 7.

In the configuration of FIG. 6, the setting terminal 60 transmits setting information 8 stored in the storage medium 9 to the server 30. Further, the setting terminal 60 receives converted setting information 8 from the server 30 and stores the converted setting information 8 in the storage medium 9. Therefore, the functions of the server 30 may be the same.

<Setting Patterns of Setting Information>

Figure 7:
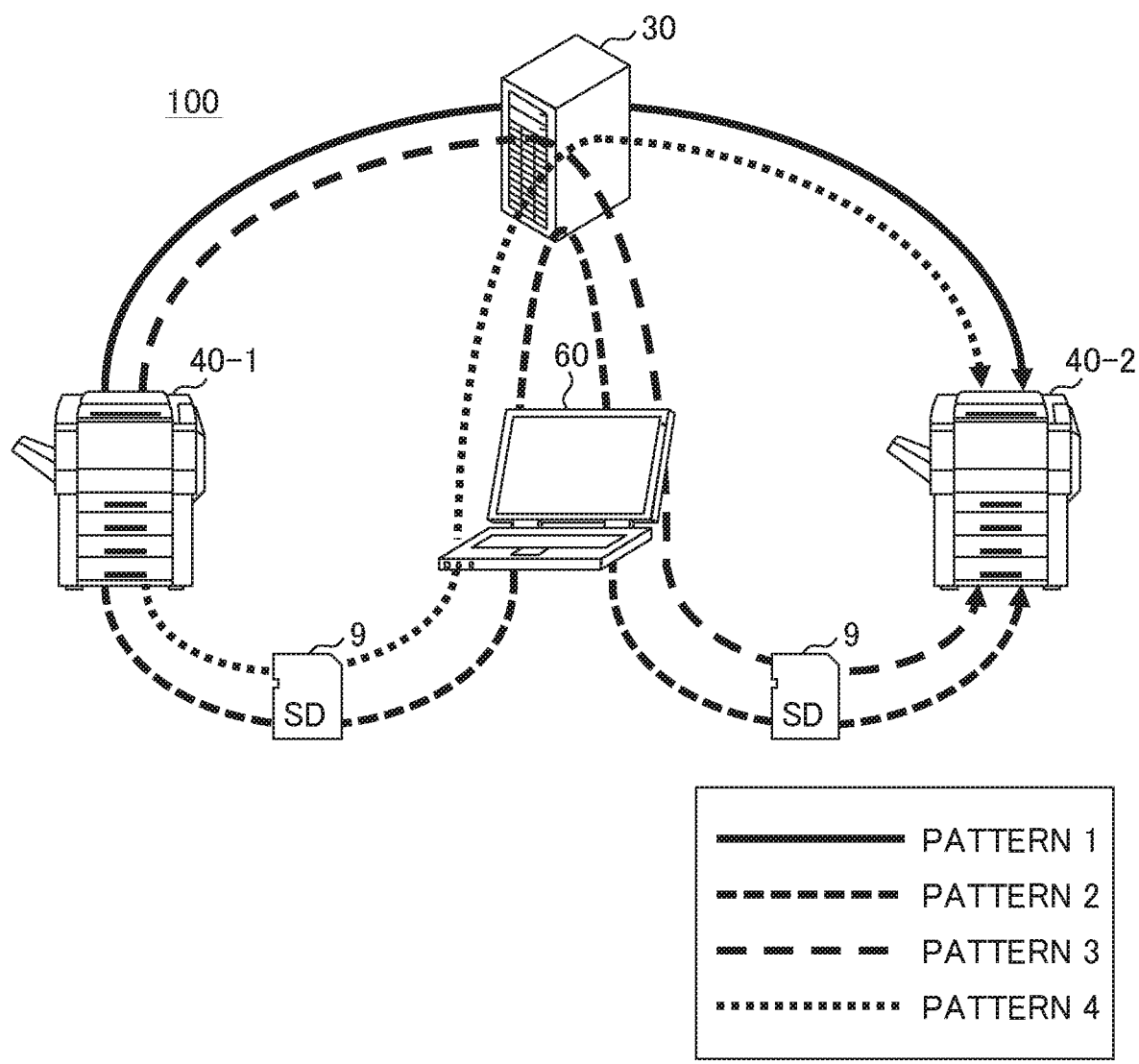
FIG. 7 is an example of a diagram for explaining patterns of setting information in the setting information utilization system.

FIG. 7 is an example of a diagram for explaining patterns in which setting information 8 is set in the setting information utilization system 100.

Pattern 1: First electronic device 40-1→Server 30→Second electronic device 40-2

Pattern 2: First electronic device 40-1→Storage medium 9→Setting terminal 60→Server 30→Setting terminal 60→Storage medium 9→Second electronic device 40-2

Pattern 3: First electronic device 40-1→Server 30→Setting terminal 60→Storage medium 9→Second electronic device 40-2

Pattern 4: First electronic device 40-1→Storage medium 9→Setting terminal 60→Server 30→Second electronic device 40-2

The patterns that are mainly used are Pattern 1 and Pattern 2. A CE or a user selects Pattern 2 in a case of a network environment where an enough communication band is not ensured or in a case where keeping setting information 8 in the server 30 is prohibited according to company regulations, etc. Furthermore, Pattern 2 is selected also in a case where a time for transmission to the server 30 is expected to be long due to, for example, a vast amount of data in an address book. Otherwise, Pattern 1 may be selected.

Furthermore, Pattern 3 or Pattern 4 may be selected in a case where situations have changed between the time of export and the time of import.

Furthermore, although setting information 8 is once stored in a storage medium 9 at the time of export or import in the present embodiment, a first electronic device 40-1 may directly transmit setting information 8 to the setting terminal 60 or a second electronic device 40-2 may directly receive setting information 8 from the setting terminal 60.

<Overall Sequence>

Figure 8:
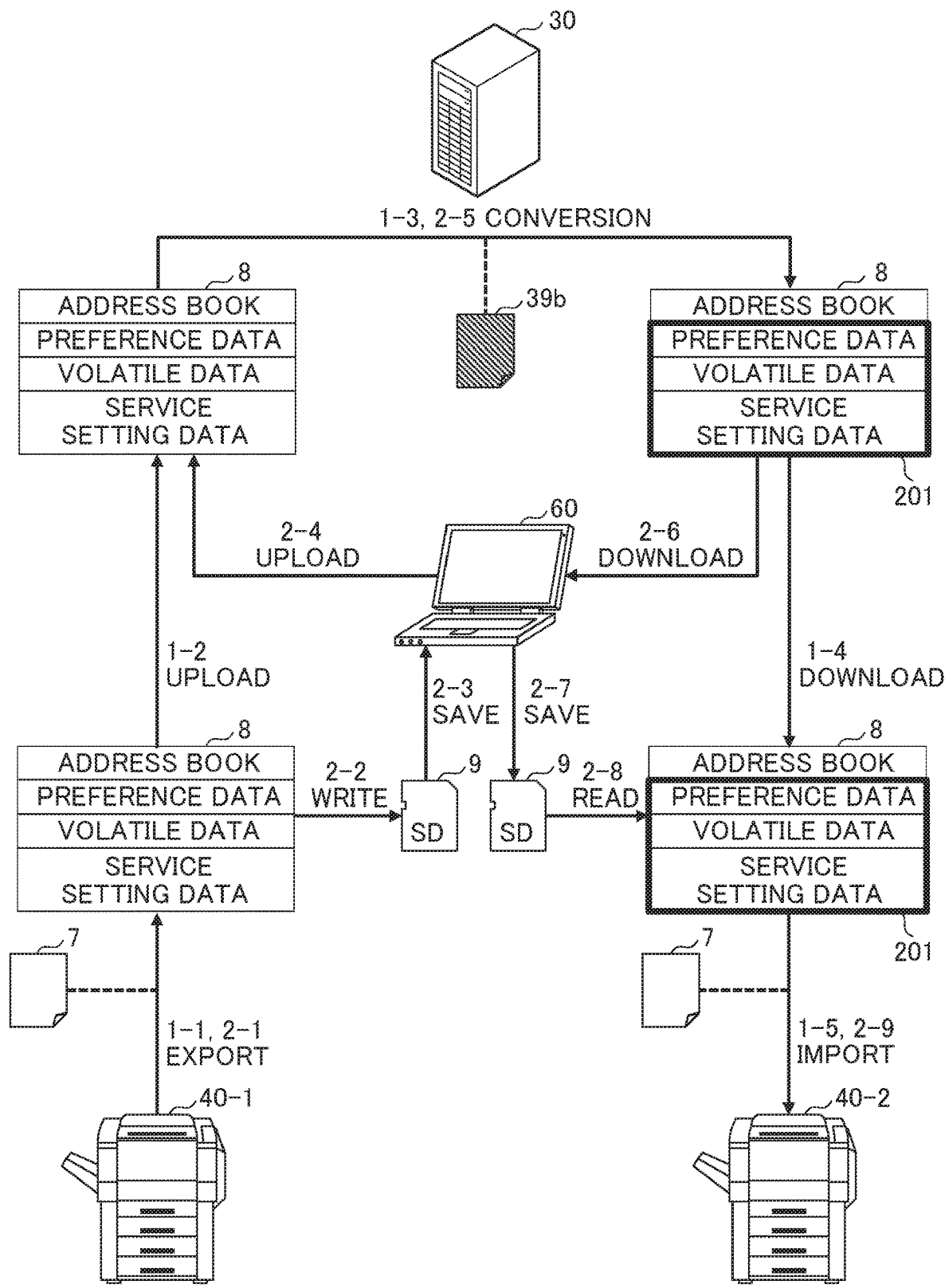
FIG. 8 is an example of a diagram for explaining an overall procedure of exporting and importing setting information.

FIG. 8 is an example of a diagram for explaining an overall sequence of export and import of setting information 8. In FIG. 8, two patterns. i.e., Pattern 1 and Pattern 2, are illustrated. However, for ease of explanation, there is no explanation of encryption.

Pattern 1

1-1. The first electronic device 40-1 exports setting information 8, based on the model-specific profile 7 of the first electronic device 40-1.

1-2. The first electronic device 40-1 transmits (i.e., uploads) a file of the exported setting information 8 to the server 30.

1-3. Upon receiving from the setting terminal 60 the setting information 8 and the model of the second electronic device 40-2, which is the conversion destination, the server 30 preforms a process of converting the setting information 8 by use of the user information management table 39*a*. In FIG. 8, regarding the setting information 8 in the server 30, the range enclosed by a thick-frame 201 is indicative of data to which conversion of some kind has been performed. The reason why the address book is not converted is because the address book is common in electronic devices 40 and because it is difficult to convert the address book as the address book is encrypted.

1-4. The second electronic device 40-2 receives (i.e., downloads) the file of the converted setting information 8 from the server 30.

1-5. The second electronic device 40-2 imports the setting information 8, based on the model-specific profile 7 of the second electronic device 40-2.

Pattern 2

2-1. The first electronic device 40-1 exports setting information 8, based on the model-specific profile 7 of the first electronic device 40-1.

2-2. The first electronic device 40-1 stores a file of the exported setting information 8 in the storage medium 9.

2-3. A CE or a user inserts the storage medium 9 to the setting terminal 60. Further, the setting terminal 60 retrieves the file of the setting information 8 from the storage medium 9.

2-4. The setting terminal 60 transmits (i.e., uploads) the model of the second electronic device 40-2 and the file of the setting information 8 to the server 30.

2-5. The server 30 performs a process of converting the setting information 8 by use of the conversion table 39*b*.

2-6. The server 30 transmits the file of the converted setting information 8 to the setting terminal 60.

2-7. The setting terminal 60 stores the downloaded file in the storage medium 9.

2-8. A CE or a user inserts the storage medium 9 to the second electronic device 40-2.

2-9. The second electronic device 40-2 imports the setting information 8, based on the model-specific profile 7 of the second electronic device 40-2.

<Overall Operation in a Case where Setting Information 8 is Encrypted in Pattern 1>

Figure 9:
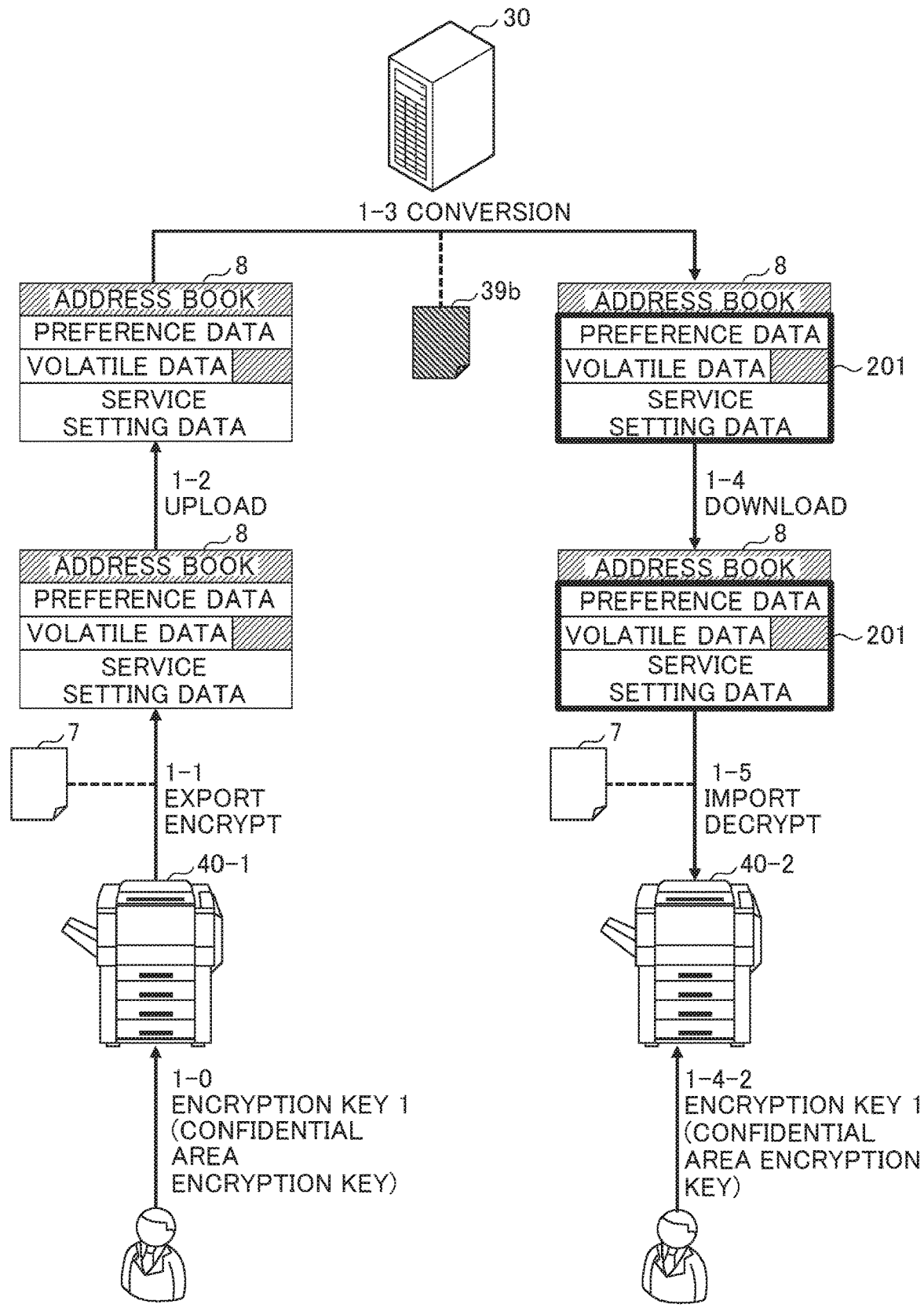
FIG. 9 is an example of a diagram for explaining an overall procedure of exporting and importing setting information encrypted in Pattern 1.

Next, with reference to FIG. 9, an overall operation in a case of encryption is explained. FIG. 9 is an example of a diagram for explaining an overall sequence of exporting and importing setting information 8 that is encrypted in Pattern 1.

1-0. A CE or a user enters the encryption key 1 in the first electronic device 40-1. The encryption key 1 is used for encrypting a setting item that is specified by the model-specific profile 7 to be encrypted.

1-1. The first electronic device 40-1 exports the setting information 8, based on the model-specific profile 7 of the first electronic device 40-1. At the time of export (i.e., in parallel to export), the first electronic device 40-1 encrypts, by use of the encryption key 1, the setting item that is specified by the model-specific profile 7 to be encrypted. In FIG. 9, encrypted data is schematically illustrated in a shaded pattern. First, the address book is entirely encrypted. Volatile data is partially encrypted. As the address book and the volatile data are highly confidential, the address book and the volatile data are encrypted by use of the encryption key 1 entered by a CE or a user.

1-2. The first electronic device 40-1 transmits (i.e., uploads) a file of the exported setting information 8 to the server 30.

1-3. The same process as 1-3 of FIG. 8 is performed.

1-4. The second electronic device 40-2 receives (i.e., downloads) a file of the converted setting information 8 from the server 30.

1-4-2. A CE or a user enters the encryption key 1, which a CE or a user remembers, in the second electronic device 40-2. The encryption key 1 is used for decrypting the setting item that is specified by the model-specific profile 7 to be encrypted.

1-5. The second electronic device 40-2 decrypts, by use of the encryption key 1, a setting item that is required to be decrypted on the basis of the model-specific profile 7 of the second electronic device 40-2 and retrieves the other setting items, so as to import the setting information 8.

<Overall Operation in a Case where Setting Information 8 is Encrypted in Pattern 2>

Figure 10:
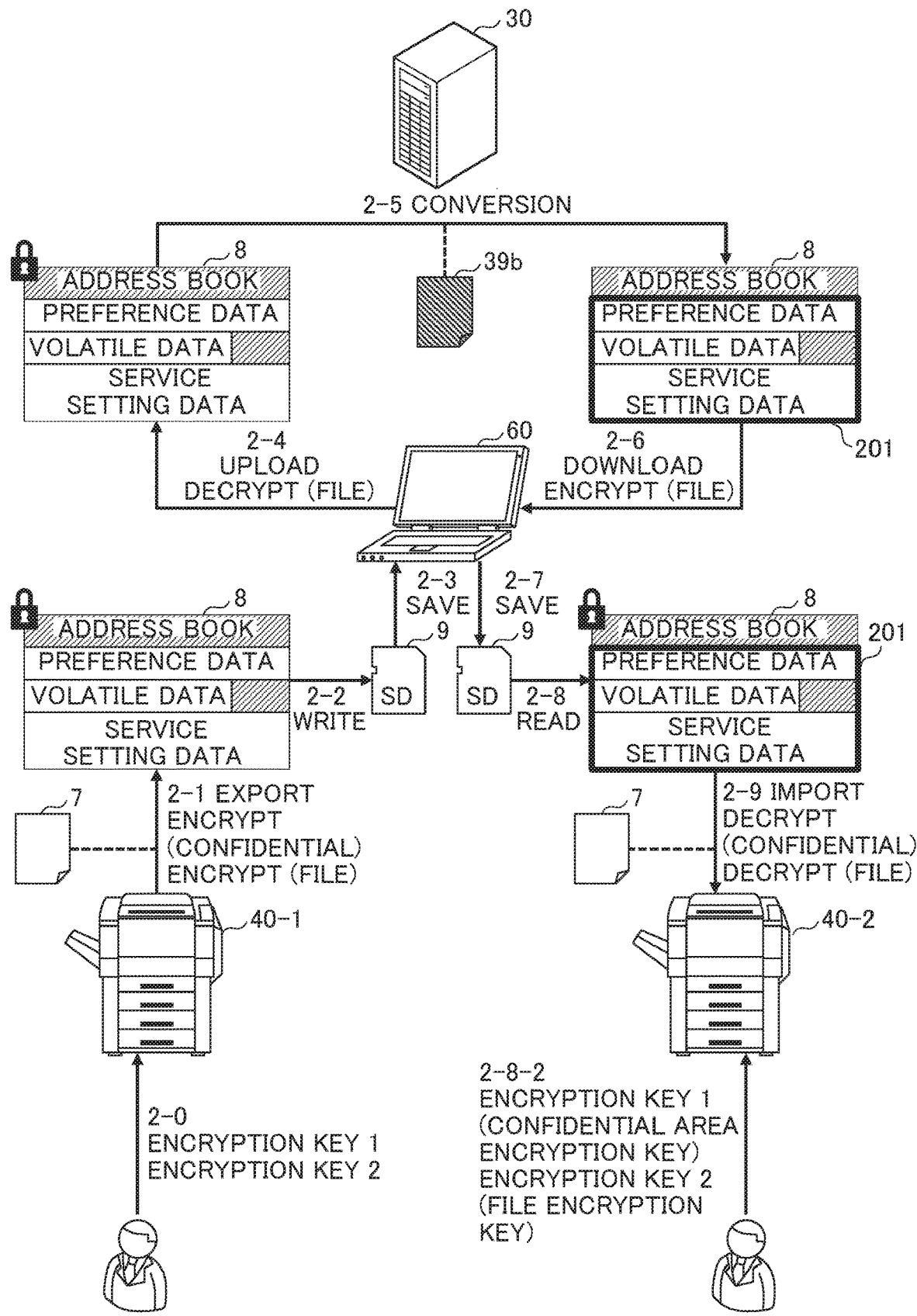
FIG. 10 is an example of a diagram for explaining an overall procedure of exporting and importing setting information encrypted in Pattern 2.

Next, with reference to FIG. 10, an overall operation in a case where setting information 8 is encrypted is explained. FIG. 10 is an example of a diagram for explaining an overall sequence of exporting and importing setting information 8 that has been encrypted in Pattern 2.

2-0. A CE and a user enters the encryption key 1 and the encryption key 2 in the first electronic device 40-1. The encryption key 1 is used for encrypting a setting item that is specified by the model-specific profile 7 to be encrypted. Further, the encryption key 2 is used for encrypting the entirety of the setting information 8.

2-1. The first electronic device 40-1 exports the setting information 8, based on the model-specific profile 7 of the first electronic device 40-1. At the time of export (i.e., in parallel to export), the first electronic device 40-1 encrypts, by use of the encryption key 1, the setting item that is specified by the model-specific profile 7 to be encrypted. Furthermore, the second electronic device 40-2 encrypts the entirety of the exported setting information 8 by use of the encryption key 2. In the above way, it is allowed to comply with a security policy in which, when the first electronic device 40-1 performs writing on the storage medium 9, encryption is performed by use of the encryption key 2, which is different from the encryption key 1 for encrypting a confidential area, for the purpose of preventing editing or defacing of a file.

2-2. The first electronic device 40-1 stores a file of the exported setting information 8 in the storage medium 9.

2-3. A CE or a user inserts the storage medium 9 to the setting terminal 60. Further, the setting terminal 60 reads the file of the setting information 8 from the storage medium 9.

2-4. The setting terminal 60 transmits (i.e., uploads) the model of the second electronic device 40-2, the file of the setting information 8, and the encryption key 2 to the server 30.

2-5. The server 30 decrypts the entirety of the setting information 8 by use of the encryption key 2 and converts the setting information 8 by use of the conversion table 39b.

2-6. The server 30 encrypts the file of the converted setting information 8 again by use of the encryption key 2 and transmits to the setting terminal 60.

2-7. The setting terminal 60 stores the downloaded file in the storage medium 9.

2-8. A CE or a user inserts the storage medium 9 to the second electronic device 40-2.

2-8-2. A CE or a user enters the encryption key 1 and the encryption key 2 in the second electronic device 40-2.

2-9. The second electronic device 40-2 firstly decrypts the entirety of the file of the setting information 8 by use of the encryption key 2. Next, the second electronic device 40-2 decrypts, by use of the encryption key 1, a setting item that is required to be decrypted on the basis of the model-specific profile 7 of the second electronic device 40-2, and retrieves the other setting items, so as to import the setting information 8.

In the above way, as a CE or a user enters two encryption keys, i.e., the encryption key 1 and the encryption key 2, safety of setting information 8 is ensured even in the storage medium 9.

<Operation Sequence>

Figure 11:
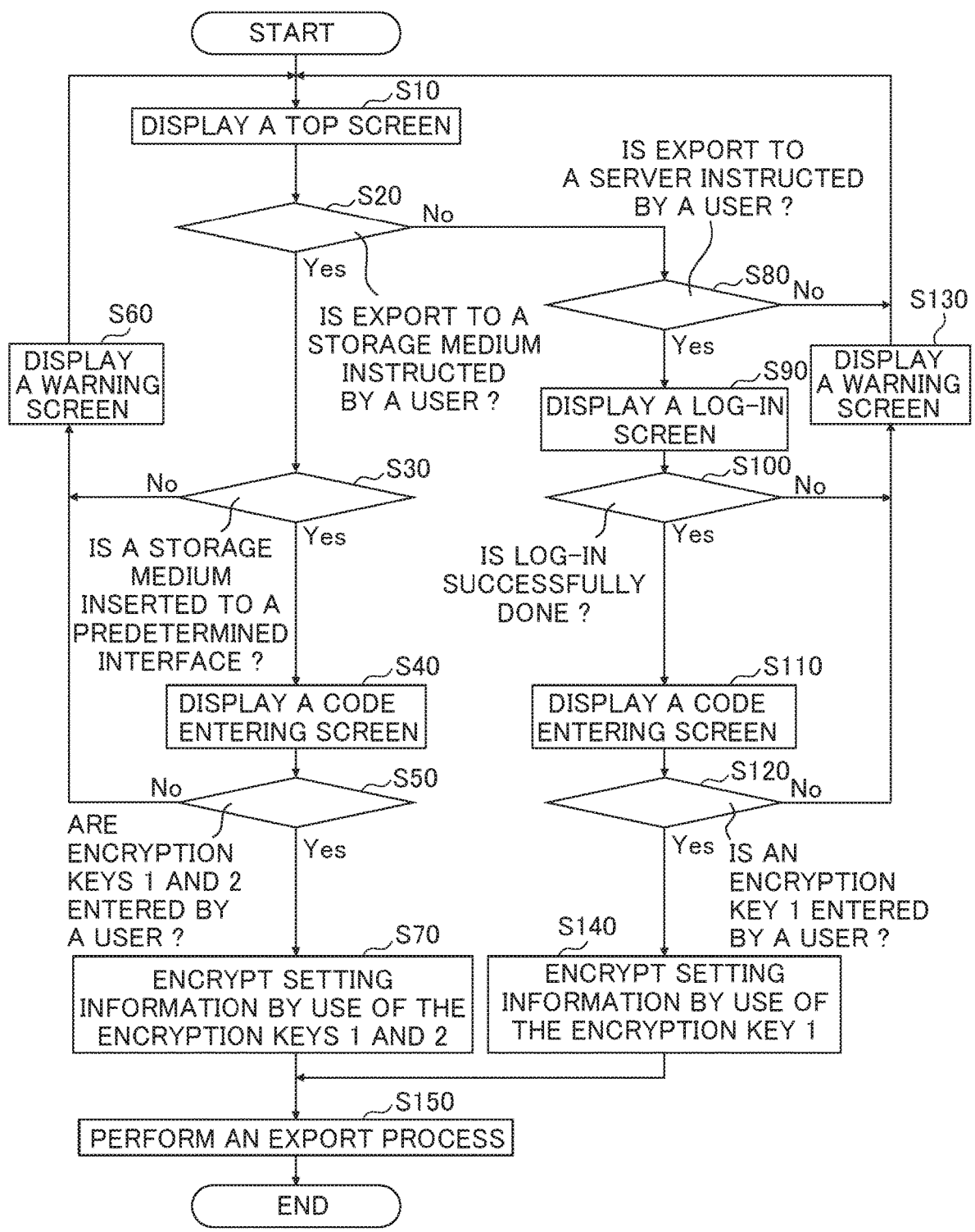
FIG. 11 is an example of a flowchart for explaining an operation of a first electronic device according to an embodiment of the present invention at the time of export in Patterns 1 and 2.

FIG. 11 is an example of a flowchart for explaining an operation of a first electronic device 40-1 at the time of export in Patterns 1 and 2. Explanation is provided with reference to examples of a screen illustrated in each of FIGS. 12A through 12H, as needed.

Figure 12A:
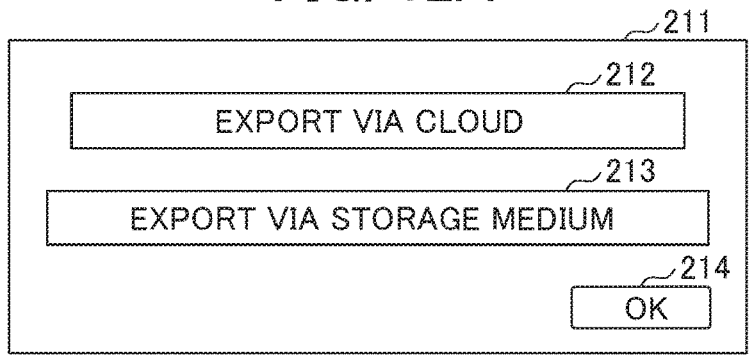
FIG. 12A is a diagram illustrating an example of a screen that the first electronic device displays on a control panel according to an embodiment of the present invention at the time of export.

First, a CE or a user operates the first electronic device 40-1 that performs export. The display/operation unit 41 of the first electronic device 40-1 accepts operation by a CE or a user and displays a top screen (S10). An example of the top screen, which may be alternatively referred to as a menu screen, is illustrated in FIG. 12A.

Next, the display/operation unit 41 of the first electronic device 40-1 determines whether the "EXPORT VIA STORAGE MEDIUM" button is pressed on the top screen (S20).

In the case of Yes at the determination of Step S20, the setting data writing unit 47 of the first electronic device 40-1 determines whether a storage medium 9 is inserted to the external connection I/F 29 (S30).

Figure 12B:
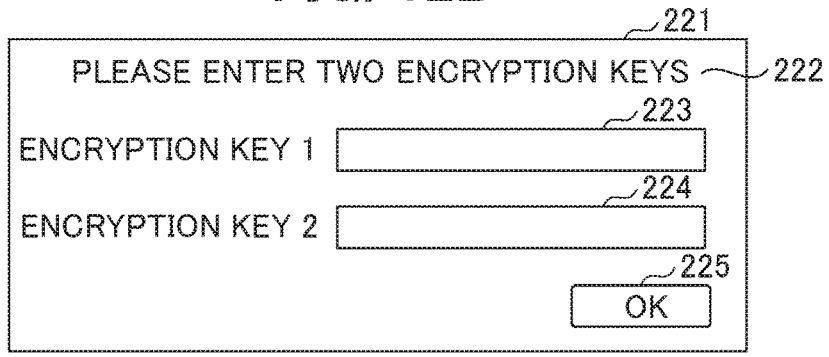
FIG. 12B is a diagram illustrating an example of a screen that the first electronic device displays on the control panel at the time of export.

In the case of Yes at the determination of Step S30, the display/operation unit 41 displays a code entering screen on the control panel 27 (S40). An example of the code entering screen is illustrated in FIG. 12B.

Next, the display/operation unit 41 of the first electronic device 40-1 determines whether an encryption key 1 and an encryption key 2 are entered on the code entering screen (S50).

Figure 12C:
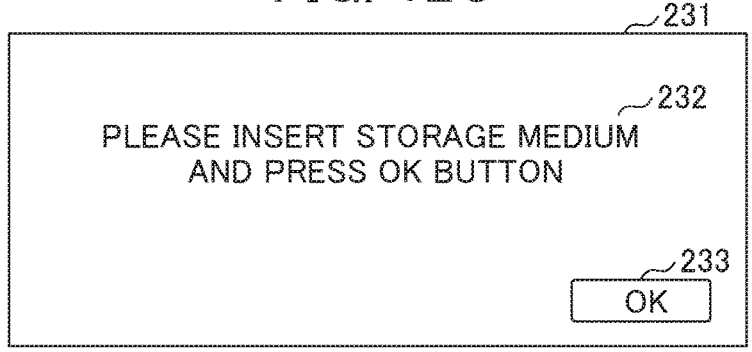
FIG. 12C is a diagram illustrating an example of a screen that the first electronic device displays on the control panel at the time of export.
Figure 12D:
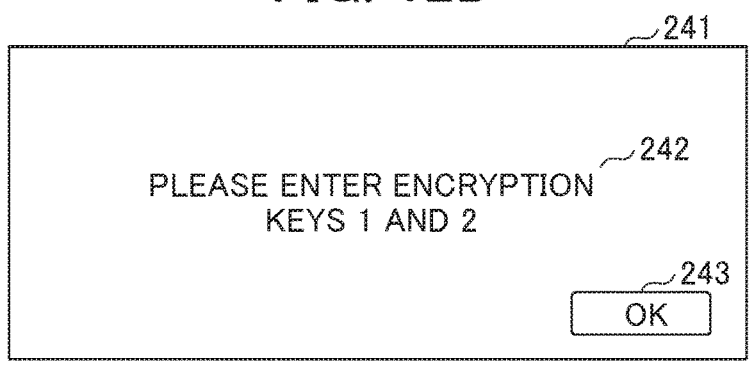
FIG. 12D is a diagram illustrating an example of a screen that the first electronic device displays on the control panel at the time of export.

In the case of No at the determination of Step S30 or Step S50, the display/operation unit 41 of the first electronic device 40-1 displays a warning screen (S60). In FIG. 12C, the warning screen displayed in the case of No at Step S30 is illustrated, in FIG. 12D, the warning screen displayed in the case of No at Step S50 is illustrated.

In the case of Yes at the determination of Step S50, the encryption unit 44a of the first electronic device 40-1 encrypts setting information 8 (S70). As described above, the setting item that is specified by the model-specific profile 7 to be encrypted is encrypted by use of the encryption key 1 and the entirety of the setting information 8 is encrypted by use of the encryption key 2.

Next, the setting data writing unit 47 of the first electronic device 40-1 writes the encrypted setting information 8 on the storage medium 9 (S150).

Contrarily, in the case of No at the determination of Step S20, the display/operation unit 41 of the first electronic device 40-1 determines whether the "EXPORT VIA CLOUD" button is pressed (S80).

Figure 12E:
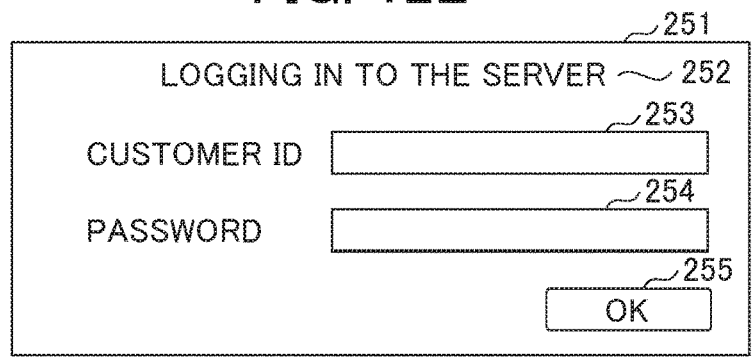
FIG. 12E is a diagram illustrating an example of a screen that the first electronic device displays on the control panel at the time of export.

In the case of Yes at the determination of Step S80, the display/operation unit 41 of the first electronic device 40-1 displays a login screen (S90). In FIG. 12E, an example of the login screen is illustrated.

Next, the setting data transmitting unit 42 of the first electronic device 40-1 determines whether the login is successfully done (S100).

Figure 12F:
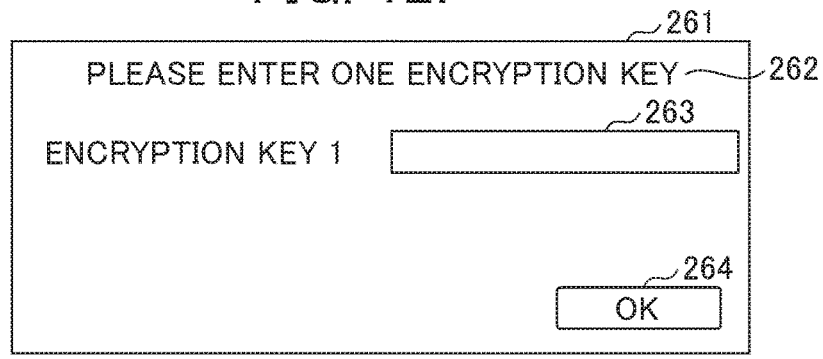
FIG. 12F is a diagram illustrating an example of a screen that the first electronic device displays on the control panel at the time of export.

In the case of Yes at the determination of Step S100, the display/operation unit 41 of the first electronic device 40-1 displays a code entering screen on the control panel 27 (S110). In FIG. 12F, an example of the code entering screen is illustrated.

Furthermore, the display/operation unit 41 of the first electronic device 40-1 determines whether the encryption key 1 is entered in the code entering screen (S120).

Figure 12G:
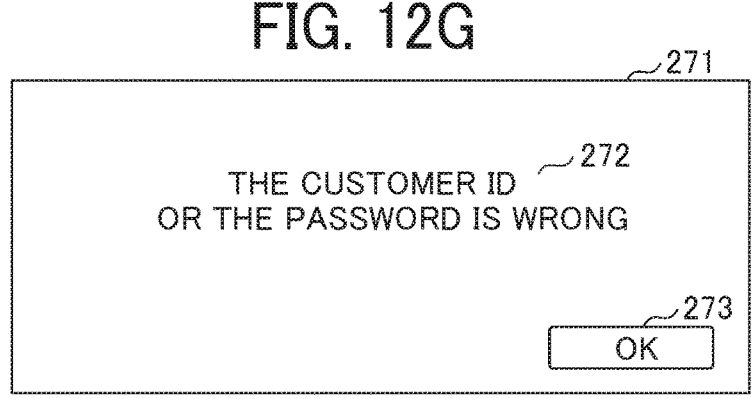
FIG. 12G is a diagram illustrating an example of a screen that the first electronic device displays on the control panel at the time of export.
Figure 12H:
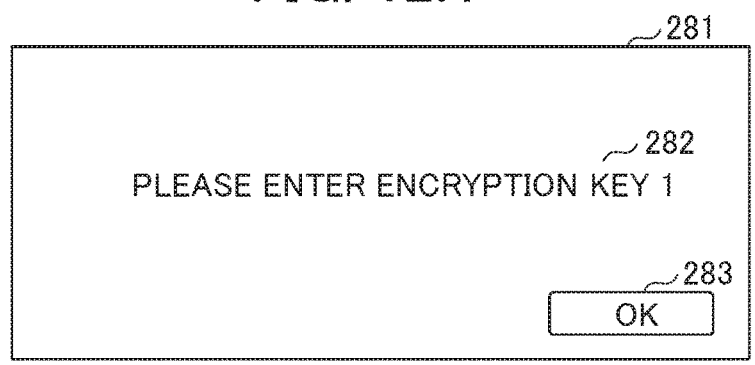
FIG. 12H is a diagram illustrating an example of a screen that the first electronic device displays on the control panel at the time of export.

In the case of No at the determination of Step S100 or S120, the display/operation unit 41 of the first electronic device 40-1 displays a warning screen (S130). In FIG. 12G, the warning screen displayed in the case of No at Step S100 is illustrated. In FIG. 12H, the warning screen displayed in the case of No at Step S120 is illustrated.

In the case of Yes at the determination of Step S120, the encryption unit 44a of the first electronic device 40-1 encrypts the setting information 8 (S140). As described above, the setting item that is specified by the model-specific profile 7 to be encrypted is encrypted by use of the encryption key 1.

Next, the setting data transmitting unit 42 of the first electronic device 40-1 transmits the encrypted setting information 8 to the server 30 (S150), and the operation ends.

Subsequently, a CE or a user manipulates the setting terminal 60 to log in to the server 30, so as to perform a conversion process. In Pattern 1, setting information 8 in the setting information storage unit 38 is specified and the model of the second electronic device 40-2 is specified. In Pattern 2, setting information 8 in the storage medium 9 is transmitted to the server 30 and the model of the second electronic device 40-2 is specified. In the above way, the server 30 converts the setting information 8 into a format for the second electronic device 40-2. It should be noted that the timing for the conversion may be between the time of export to the time of import.

<Examples of Screens>

FIGS. 12A through 12H are diagrams each illustrating an example of a screen that a first electronic device 40-1 displays on the control panel 27 at the time of export.

In FIG. 12A, an example of a top screen 211 is illustrated. The top screen 211 includes the "EXPORT VIA CLOUD" button 212 and the "EXPORT VIA STORAGE MEDIUM" button 213. A CE or a user selects either one of the buttons and presses the "OK" button 214. The display/operation unit 41 of the first electronic device 40-1 accepts manipulation by a CE or a user.

In FIG. 12B, an example of a code entering screen 221 is illustrated. The code entering screen 221 includes the message 222 saying "PLEASE ENTER TWO ENCRYPTION KEYS", the encryption key 1 entering field 223, and the encryption key 2 entering field 224. A CE or a user enters an encryption key 1 in the encryption key 1 entering field 223 and enters an encryption key 2 in the encryption key 2 entering field 224. Further, a CE or a user presses the "OK" button 225. In a case where at least one of the fields is blank, or in a case where there are not enough digits, an error occurs. The display/operation unit 41 of the first electronic device 40-1 accepts input entered by a CE or a user.

The warning screen 231 of FIG. 12C includes the message 232 saying "PLEASE INSERT STORAGE MEDIUM AND PRESS OK BUTTON". A CE or a user checks the message and presses the "OK" button 233. The warning screen 241 of FIG. 12D includes the message 242 saying "PLEASE ENTER ENCRYPTION KEYS 1 AND 2". A CE or a user checks the message and presses the "OK" button 243.

In FIG. 12E, an example of a log-in screen 251 is illustrated. The log-in screen 251 includes the message 252 saying "LOGGING IN TO THE SERVER", the customer ID entering field 253, and the password entering field 254. A CE or a user enters customer ID in the customer ID entering field 253 and enters a password in the password entering field 254. Further, a CE or a user presses the "OK" button 255. In a case where at least one of the fields is blank, an error occurs. In addition, in a case where the customer ID or the password is wrong, the server 30 determines that the authentication has fell through, and therefore the CE or the user cannot log in to the server 30.

In FIG. 12F, an example of a code entering screen 261 is illustrated. The code entering screen 261 includes the message 262 saying "PLEASE ENTER ONE ENCRYPTION KEY" and the encryption key 1 entering field 263. A CE or a user enters an encryption key 1 in the encryption key 1 entering field 263 and presses the "OK" button 264. In a case where the field is blank or in a case where there are not enough digits, an error occurs. The display/operation unit 41 of the first electronic device 40-1 accepts input entered by a CE or a user.

The warning screen 271 of FIG. 12G includes the message 272 saying "THE CUSTOMER ID OR THE PASSWORD IS WRONG". A CE or a user checks the message 272 and presses the "OK" button 273. The warning screen 281 of FIG. 12H includes the message 282 saying "PLEASE ENTER ENCRYPTION KEY 1". A CE or a user checks the message 282 and presses the "OK" button 283.

<Operation Sequence>

Figure 13:
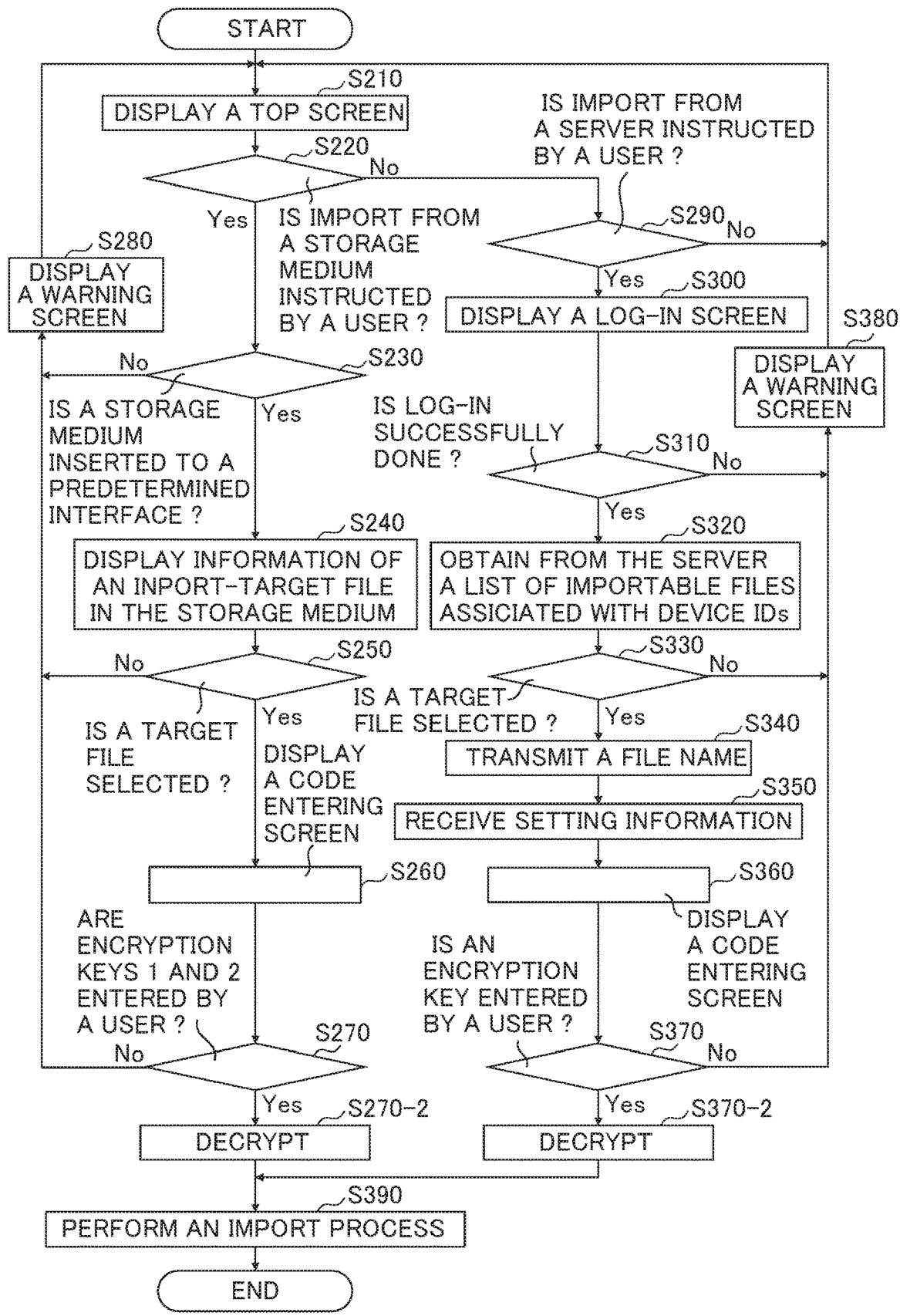
FIG. 13 is an example of a flowchart for explaining an operation of a second electronic device according to an embodiment of the present invention at the time of import in Patterns 1 and 2.

FIG. 13 is an example of a flowchart for explaining an operation of a second electronic device 40-2 at the time of import in Patterns 1 and 2. Explanation is provided with reference to examples of a screen illustrated in each of FIGS. 14A to 14H, as needed.

First, a CE or a user manipulates the second electronic device 40-2 that performs import. The display/operation unit 41 of the second electronic device 40-2 accepts manipulation by a CE or a user and displays a top screen (S210). In FIG. 14A, an example of the top screen is illustrated.

Next, the display/operation unit 41 of the second electronic device 40-2 determines whether the "IMPORT VIA STORAGE MEDIUM" button is pressed (S220).

In the case of Yes at the determination of Step S220, the setting data writing unit 47 of the first electronic device 40-1 determines whether the storage medium 9 is inserted to the external connection I/F 29 (S230).

In the case of Yes at the determination of Step S230, the display/operation unit 41 displays an import-target file (i.e., setting information 8), which is stored in the storage medium 9, on the control panel 27 (S240). That is to say, the setting data reading unit 48 of the second electronic device 40-2 accesses to the storage medium 9, so as to retrieve device ID, a file name of a file of a predetermined extension, a timestamp, and a comment. The display/operation unit 41 displays a list of import-target files on the control panel 27. In FIG. 14B, an example of an import-target file list screen is illustrated.

Next, the display/operation unit 41 determines whether an import-target file is selected (S250).

In the case of Yes at the determination of Step S250, the display/operation unit 41 of the second electronic device 40-2 displays a code entering screen on the control panel 27 (S260). In FIG. 14C, an example of the code entering screen is illustrated.

Next, the display/operation unit 41 of the first electronic device 40-1 determines whether an encryption key 1 and an encryption key 2 are entered on the code entering screen (S270).

In the case of No at the determination of Step S230. S250, or S270, the display/operation unit 41 of the first electronic device 40-1 displays a warning screen (S280). In FIG. 14D, the warning screen displayed in the case of No at Step S230 is illustrated. In FIG. 14E, the warning screen displayed in the case of No at Step S250 is illustrated. In FIG. 14F, the warning screen displayed in the case of No at Step S270 is illustrated.

In the case of Yes at the determination of S270, the decryption unit 45a of the second electronic device 40-2 decrypts the setting information 8 (S270-2). First, the entirety of the setting information 8 is decrypted by use of the encryption key 2. Next, a setting item that is specified by the model-specific profile 7 to be encrypted is decrypted by use of the encryption key 1.

Furthermore, the basic function unit 46 of the second electronic device 40-2 writes the decrypted setting information 8 on the storage unit 49, so as to import the decrypted setting information 8 (S390).

Contrarily, in the case of No at the determination of Step S220, the display/operation unit 41 of the second electronic device 40-2 determines whether the "IMPORT VIA CLOUD" button is pressed (S290).

In the case of Yes at the determination of Step S290, the display/operation unit 41 of the second electronic device 40-2 displays a log-in screen (S300). In FIG. 14G an example of the log-in screen is illustrated.

Next, the setting data transmitting unit 42 of the second electronic device 40-2 determines whether the log-in is successfully done (S310).

In the case of Yes at the determination of Step S310, the setting data receiving unit 43 of the second electronic device 40-2 receives, from the server 30, a list of import-target files that are specified by the log-in (S320). "FILE OF SETTING INFORMATION" in the setting information storage unit 38 that is specified by the log-in is an import-target file. It should be noted that the setting information 8 has already been converted. The display/operation unit 41 of the second electronic device 40-2 displays the list of import-target files on the control panel 27. In FIG. 1411, an example of the import-target file list screen is illustrated.

Next, the display/operation unit 41 of the second electronic device 40-2 determines whether an import-target file is selected (S330).

In the case of Yes at the determination of Step S330, the setting data transmitting unit 42 if the second electronic device 40-2 transmits, to the server 30, information (e.g., a file name, etc.) for specifying the file (S340).

The setting data receiving unit 43 of the second electronic device 40-2 receives the setting information 8 that is specified by the file name, etc., from the server 30 (S350).

Figure 15A:
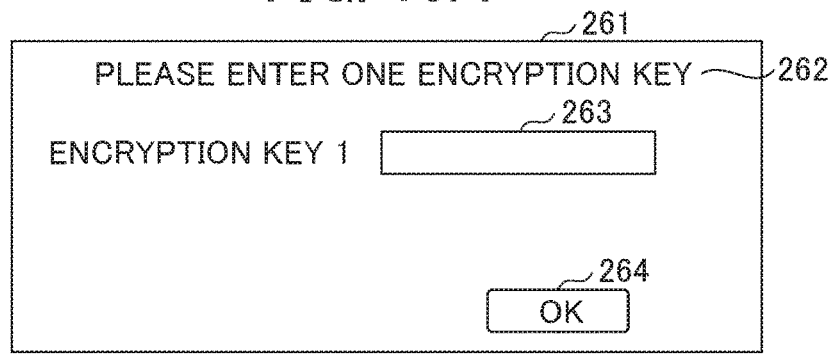
FIG. 15A is a diagram illustrating an example of a screen that the second electronic device displays on the control panel at the time of import.

Upon receiving the setting information 8, the display/operation unit 41 of the second electronic device 40-2 displays a code entering screen on the control panel 27 (S360). In FIG. 15A, an example of the code entering screen is illustrated.

Furthermore, the display/operation unit 41 of the first electronic device 40-1 determines whether the encryption key 1 is entered in the code entering screen (S370).

Figure 15B:
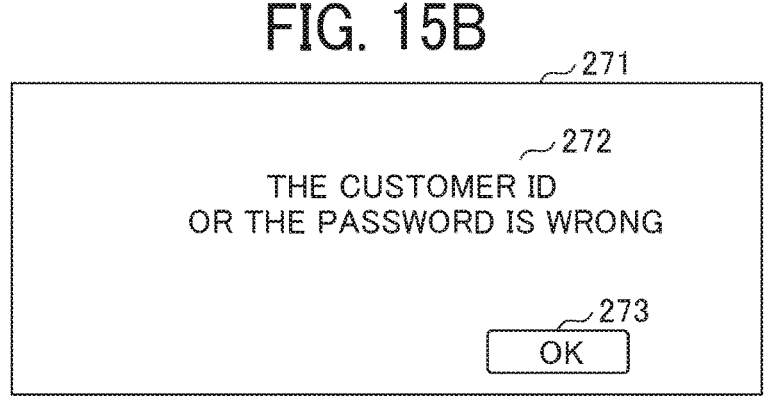
FIG. 15B is a diagram illustrating an example of a screen that the second electronic device displays on the control panel at the time of import.
Figure 15C:
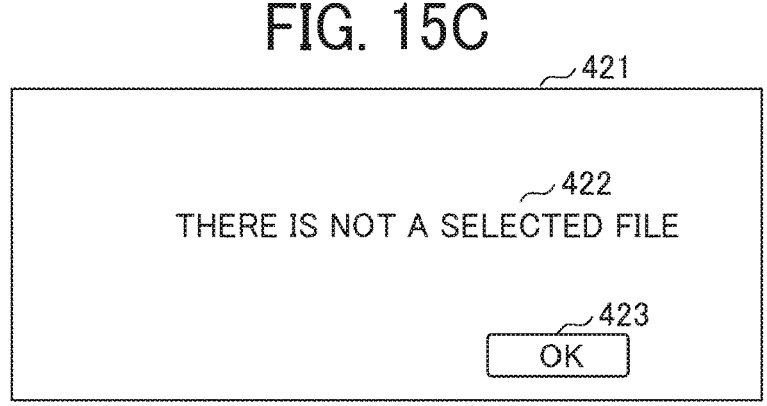
FIG. 15C is a diagram illustrating an example of a screen that the second electronic device displays on the control panel at the time of import.
Figure 15D:
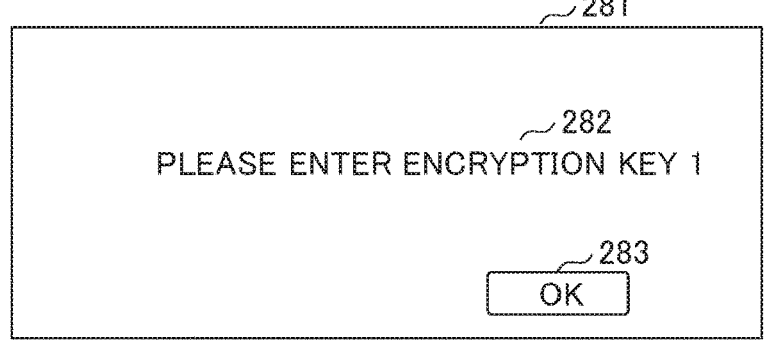
FIG. 15D is a diagram illustrating an example of a screen that the second electronic device displays on the control panel at the time of import.

In the case of No at the determination of Step S310, S330, or S370, the display/operation unit 41 of the first electronic device 40-1 displays a warning screen (S380). In FIG. 15B, the warning screen displayed in the case of No at Step S310 is illustrated. In FIG. 15C, the warning screen displayed in the case of No at Step S330 is illustrated. In FIG. 15D, the warning screen displayed in the case of No at Step S370 is illustrated.

In the case of Yes at the determination of Step S370, the decryption unit 45a of the second electronic device 40-2 decrypts the setting information 8 (S370-2). As described above, the setting item that is specified by the model-specific profile 7 to be encrypted is decrypted by use of the encryption key 1.

Then, the basic function unit 46 of the second electronic device 40-2 writes the decrypted setting information 8 on the storage unit 49 (S390).

<Examples of Screens>

FIGS. 14A through 14H and FIGS. 15A through 15D are diagrams each illustrating an example of a screen that a second electronic device 40-2 displays on the control panel 27 at the time of import. FIG. 14A is the same as FIG. 12A. FIG. 14C is the same as FIG. 12B. FIG. 14D is the same as FIG. 12C. FIG. 14F is the same as FIG. 12D. FIG. 14G is the same as FIG. 12E. Therefore, explanation is given regarding FIGS. 14B, 14E, and 14H.

In each of FIGS. 14B and 14H, an example of an import-target file list screen 401 is illustrated. The import-target file list screen 401 includes an item section 402 and an attribute value 403. An item section 402 and an attribute value 403 are information registered in the setting information management table illustrated as Table 3. A CE or a user selects a file to be imported and presses the "OK" button 404.

The warning screen 411 of FIG. 14E includes the message 412 saying "THERE IS NOT A SELECTED FILE". A CE or a user checks the message 412 and presses the "OK" button 413.

Next, FIG. 15A is the same as FIG. 12F. FIG. 15B is the same as FIG. 12G FIG. 15D is the same as FIG. 12H. Therefore, explanation is given regarding FIG. 15C.

The warning screen 421 of FIG. 15C includes the message 422 saying "THERE IS NOT A SELECTED FILE". A CE or a user checks the message 422 and presses the "OK" button 423.

As explained above, in the setting information utilization system 100 according to the present embodiment, the encryption method changes, depending on whether setting information 8 is exported to the server 30 or to the storage medium 9, so as to ensure security of the setting information 8, regardless of whether the setting information 8 exists in the server 30 or in the storage medium 9.

Second Embodiment

As explained in the first embodiment, it is required that, in Pattern 1, a CE or a user enters an encryption key 1 and that, in Pattern 2, a CE or a user enters an encryption key 1 and an encryption key 2. It may be bothersome in terms of management that a CE or a user needs to remember or note down at least the encryption key 1.

In view of the above situation, in the following embodiment, a setting information utilization system 100 in which a need for managing an encryption key 1 and an encryption key 2 in Pattern 2 is reduced.

<Overall Operation in a Case where Setting Information is Encrypted in Pattern 2>

Figure 16:
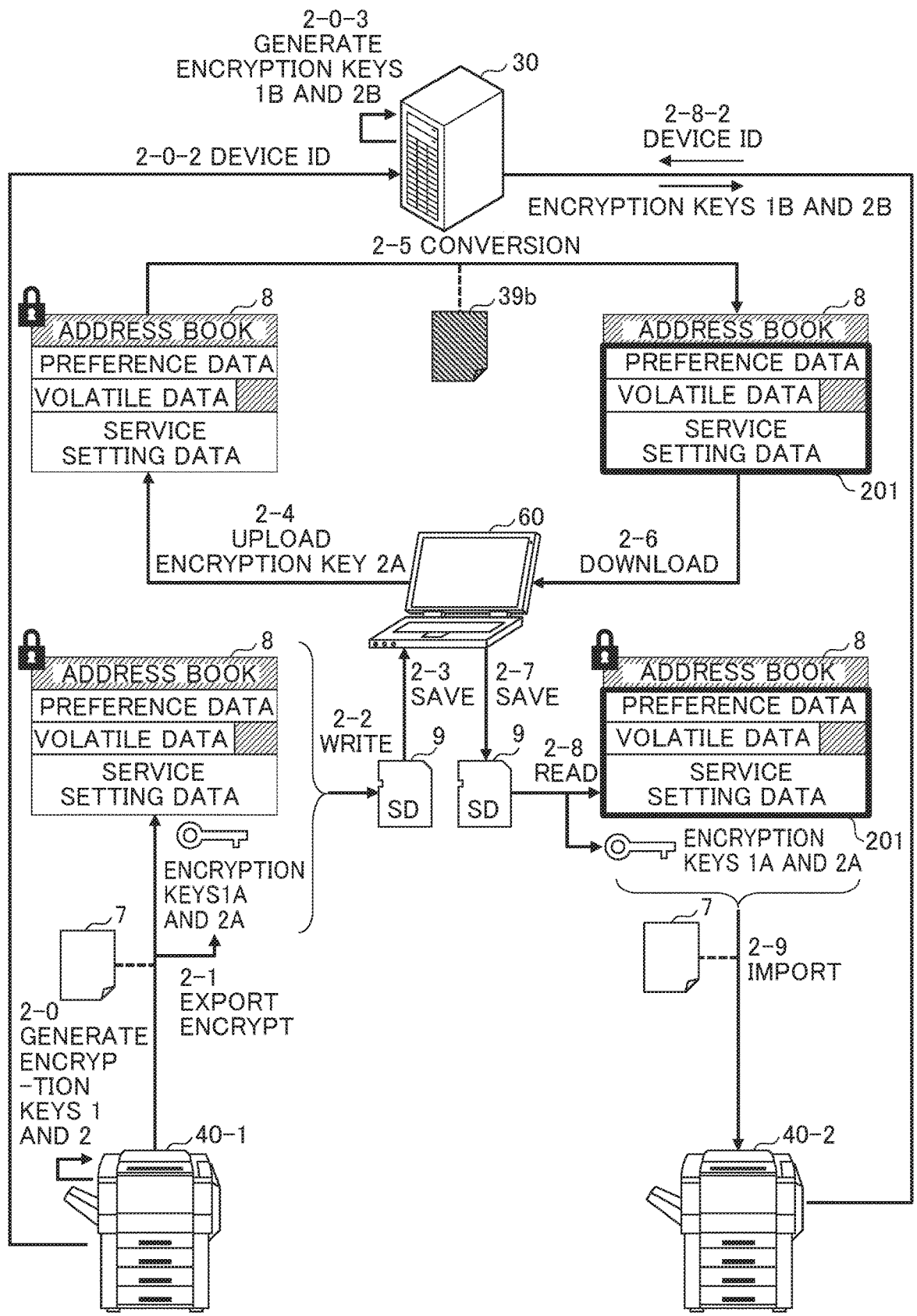
FIG. 16 is an example of a diagram for explaining an overall procedure of exporting and importing setting information encrypted in Pattern 2, according to a second embodiment.

FIG. 16 is an example of a diagram for explaining an overall sequence of exporting and importing setting information 8 that is encrypted in Pattern 2.

2-0. The first electronic device 40-1 generates an encryption key 1 and an encryption key 2, based on device ID, in a predetermined logic.

2-0-2. The first electronic device 40-1 transmits device ID to the server 30. The device ID should only be information that is unique to the first electronic device 40-1.

2-0-3. The server 30 generates an encryption key 1B and an encryption key 2B, based on the device ID.

2-1. The first electronic device 40-1 exports setting information 8, based on the model-specific profile 7 of the first electronic device 40-1. At the time of export (i.e., in parallel to export), the first electronic device 40-1 encrypts, by use of an encryption key 1, a setting item that is specified by the model-specific profile 7 to be encrypted. Furthermore, the first electronic device 40-1 encrypts the entirety of the exported setting information 8 by use of an encryption key 2.

2-2. The first electronic device 40-1 stores a file of the exported setting information 8 in the storage medium 9. The device ID of the first electronic device 40-1, an encryption key 1A, which is generated based on the encryption key 1 in a predetermined logic, and an encryption key 2A, which is generated based on the encryption key 2 in a predetermined logic, are written on the storage medium 9.

2-3. A CE or a user inserts the storage medium 9 to the setting terminal 60. Further, the setting terminal 60 retrieves the file of the setting information 8 from the storage medium 9.

2-4. The setting terminal 60 transmits, to the server 30, the model of the second electronic device 40-2, the file of the setting information 8, and the encryption key 2A.

2-5. The server 30 generates the encryption key 2, based on the managed encryption keys 2B and 2A. Further, the server 30 decrypts the setting information 8 by use of the encryption key 2. Further, the server 30 converts the setting information 8 by use of the conversion table 39b.

2-6. The server 30 encrypts the file of the converted setting information 8 again, by use of the encryption key 2, and transmits to the setting terminal 60.

2-7. The setting terminal 60 stores the downloaded file in the storage medium 9.

2-8. A CE or a user inserts the storage medium 9 to the second electronic device 40-2.

2-8-2. The second electronic device 40-2 transmits the device ID of the first electronic device 40-1, which is stored in the storage medium 9, to the server 30. Further, the second electronic device 40-2 obtains the encryption keys 1B and 2B managed by the server 30.

2-9. The second electronic device 40-2 retrieves the encryption keys 1A and 2A from the storage medium 9. The second electronic device 40-2 generates the encryption key 2, based on the encryption keys 2A and 2B. Further, the second electronic device 40-2 decrypts the entirety of the setting information 8. The second electronic device 40-2 generates the encryption key 1, based on the encryption keys 1A and 1B. The second electronic device 40-2 decrypts, by use of the encryption key 1, the setting item that is required to be decrypted on the basis of the model-specific profile 7 of the second electronic device 40-2 and retrieves the other setting items, so as to import the setting information 8.

This ensures safety of the setting information 8 in the storage medium 9 even though a CE or a user does not enter both of the two encryption keys 1 and 2.

<Functions>

Figure 17:
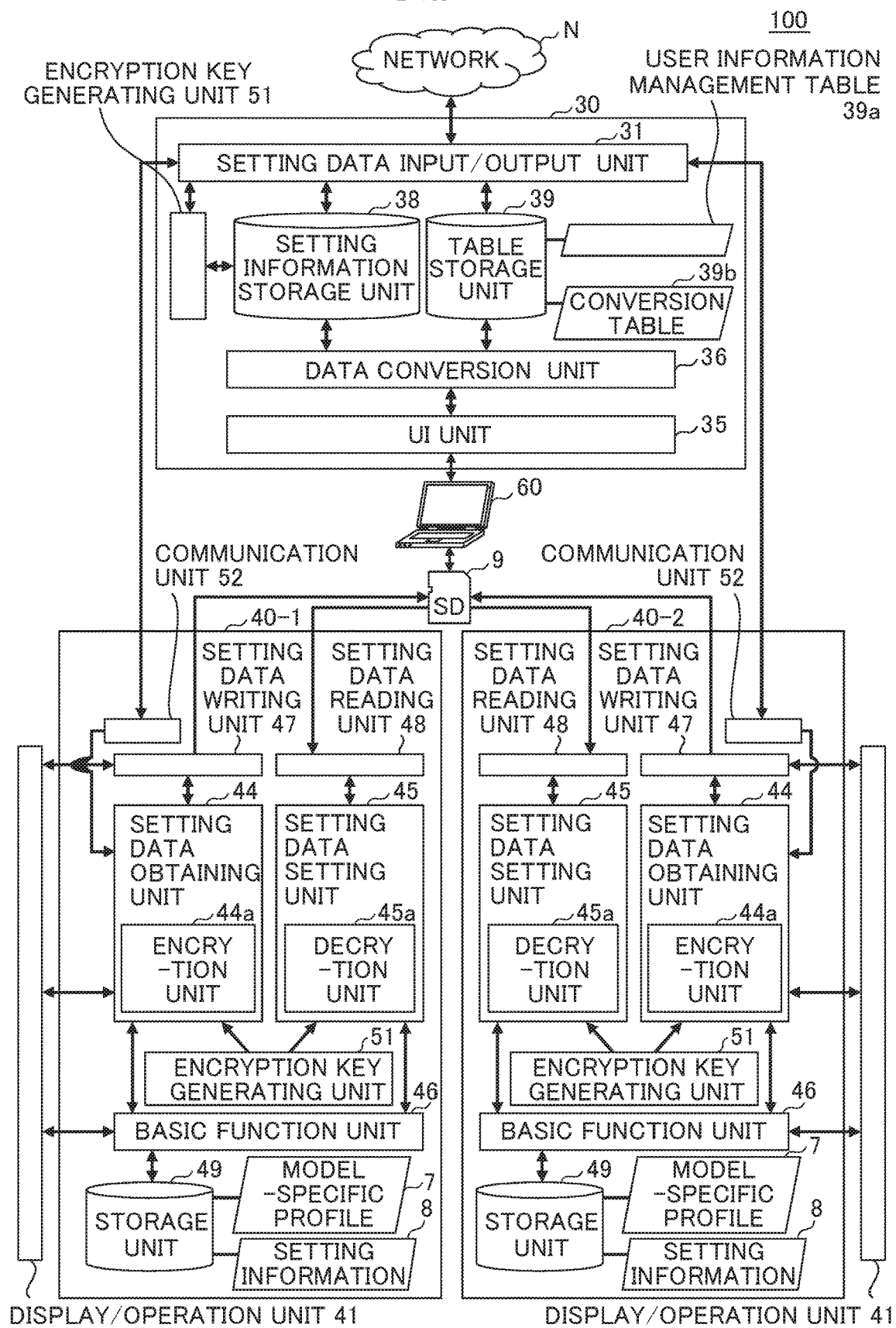
FIG. 17 is an example of a functional block diagram of the setting information utilization system, which is for explaining functions of the electronic device and the server using blocks, according to the second embodiment.

FIG. 17 is an example of a functional block diagram of the setting information utilization system 100 according to the second embodiment of the present invention, which is for explaining functions of the electronic devices 40 and the server 30 using blocks. In the functional block diagram of FIG. 17, a case in which an electronic device 40 transmits setting information 8 to a server 30 is described. It should be noted that, in the explanation of FIG. 17, the difference from FIG. 6 is mainly explained.

Each of the first electronic device 40-1 and the second electronic device 40-2 includes an encryption key generating unit 51. The encryption key generating unit 51 of the first electronic device 40-1 generates an encryption key 1 in a predetermined logic, based on the device ID of the first electronic device 40-1, and generates an encryption key 1A in a predetermined logic, based on the encryption key 1. The setting data writing unit 47 stores the encryption key 1A and the device ID of the first electronic device 40-1 in the storage medium 9.

The encryption key generating unit 51 of the second electronic device 40-2 generates the encryption key 1, based on the encryption key 1A in the storage medium 9 and an encryption key 2B obtained from the server 30. This allows the decryption unit 45a to decrypt the setting information 8.

As for an encryption key 2, the first electronic device 40-1 and the second electronic device 40-2 perform similar processes as well. In the above way, a CE or a user need not manage encryption keys, regardless of the number of encryption keys that should be managed by the CE or the user.

Furthermore, each of the first electronic device 40-1 and the second electronic device 40-2 includes a communication unit 52. Therefore, it is possible to respectively communicate with the server 30 for transmitting the device ID, etc., of the first electronic device 40-1 to the server 30 or for receiving an encryption key 1B and an encryption key 2B from the server 30.

Additionally, the server 30 includes the encryption key generating unit 51 as well. The encryption key generating unit 51 of the server 30 generates the encryption key 1B and the encryption key 2B in a predetermined logic, based on the device ID of the first electronic device 40-1.

Although the encryption key 1 and the encryption key 2 are needed for decrypting the setting information 8, there are only an encryption key 1B and an encryption key 2B in the server 30. Therefore, there is not the risk of leaking the encryption key 1 and the encryption key 2 from the server 30. Furthermore, the storage medium 9 only stores an encryption key 1A and an encryption key 2A. Therefore, even though the storage medium 9 is lost, stolen, etc., safety of the setting information 8 is ensured.

TABLE 5

| DEVICE ID | FILE OF SETTING INFORMATION | TIMESTAMP | COMMENT | ENCRYPTION KEY |
|---|---|---|---|---|
| 3F55-11111 | .../3F55-11111/setting.cab | 2017/04/18/10:10 | A COMPANY HUMAN RESOURCES DIVISION | ENCRYPTION KEY 1B **** ENCRYPTION KEY 2B **** |

TABLE 5-continued

| DEVICE ID | FILE OF SETTING INFORMATION | TIMESTAMP | COMMENT | ENCRYPTION KEY |
|---|---|---|---|---|
| 3F32-22222 | .../3F32-22222/setting.cab | 2017/04/18/12:35 | A COMPANY INTELLECTUAL PROPERTY DIVISION | ENCRYPTION KEY 1B **** ENCRYPTION KEY 2B **** |
| . | . | . | . | . |
| . | . | . | . | . |
| . | . | . | . | . |

In Table 5, an example of a setting information management table according to the present embodiment is illustrated. In comparison with the first embodiment, an encryption key 1B and an encryption key 2B are registered in association with device ID.

TABLE 6

| DEVICE ID | 3F55-11111 |
|---|---|
| SETTING INFORMATION | setting.cab |
| ENCRYPTION KEY 1A | **** |
| ENCRYPTION KEY 2A | **** |

In Table 6, information stored in the storage medium 9 is schematically illustrated. In the storage medium 9 according to the present embodiment, the device ID of the first electronic device 40-1, the setting information 8, the encryption key 1A and the encryption key 2A are stored.

<Re: Predetermined Logics>

The encryption key generating unit 51 of the first electronic device 40-1 generates an encryption key 1 in a predetermined logic, based on the device ID. By use of a predetermined logic, for example, an N-digit (i.e., p-digit+q-digit) encryption key 1 is uniquely generated. The predetermined logic may be, for example, rearrangement, addition of a predetermined character string, a hash function, or combination of the above. Furthermore, regarding the predetermined logic used by the encryption key generating unit 51 of the first electronic device 40-1 to generate an encryption key 1A, based on an encryption key 1, the logic may be a process of extracting p digits from the encryption key 1, for example. P digits may be the first digits, the last digits, or digits made by extracting every other digit.

Furthermore, the server 30 uniquely generates, by use of the device ID, an encryption key 1B that corresponds to q digits of an encryption key 1. Therefore, the encryption key 1 is configured as below.

Encryption key 1 (N digits)=Encryption key 1A (p digits)+Encryption key 1B (q digits)

Only the first electronic device 40-1 is able to generate the encryption key 1 and the server 30 is able to generate only a part of the encryption key 1. Therefore, even though the encryption key 1B is kept in the server 30, safety is ensured. The encryption key 2 is processed in the same way as well.

<Variation of the Method for Generating an Encryption Key 1 and an Encryption Key 2>

In addition to the method for generating an encryption key 1A and an encryption key 2A as described above, there may be generation methods as described below.

I. A first electronic device 40-1 generates an encryption key 1 and stores an encryption key 1A in the storage medium 9. Then, the server 30 generates an encryption key 1B (as described above).

II. A first electronic device 40-1 generates an encryption key 1 and stores an encryption key 1A in the storage medium 9. Then, the first electronic device 40-1 transmits an encryption key 1B to the server 30.

III. The first electronic device 40-1 transmits the device ID to the server 30. Then, the server 30 generates an encryption key 1. The server 30 transmits an encryption key 1A to the first electronic device 40-1 and keeps an encryption key 1B.

In any methods, the entirety of an encryption key 1 is not kept in the storage medium 9 or the server 30. Therefore, safety is ensured.

<Operation Sequence>

Figure 18:
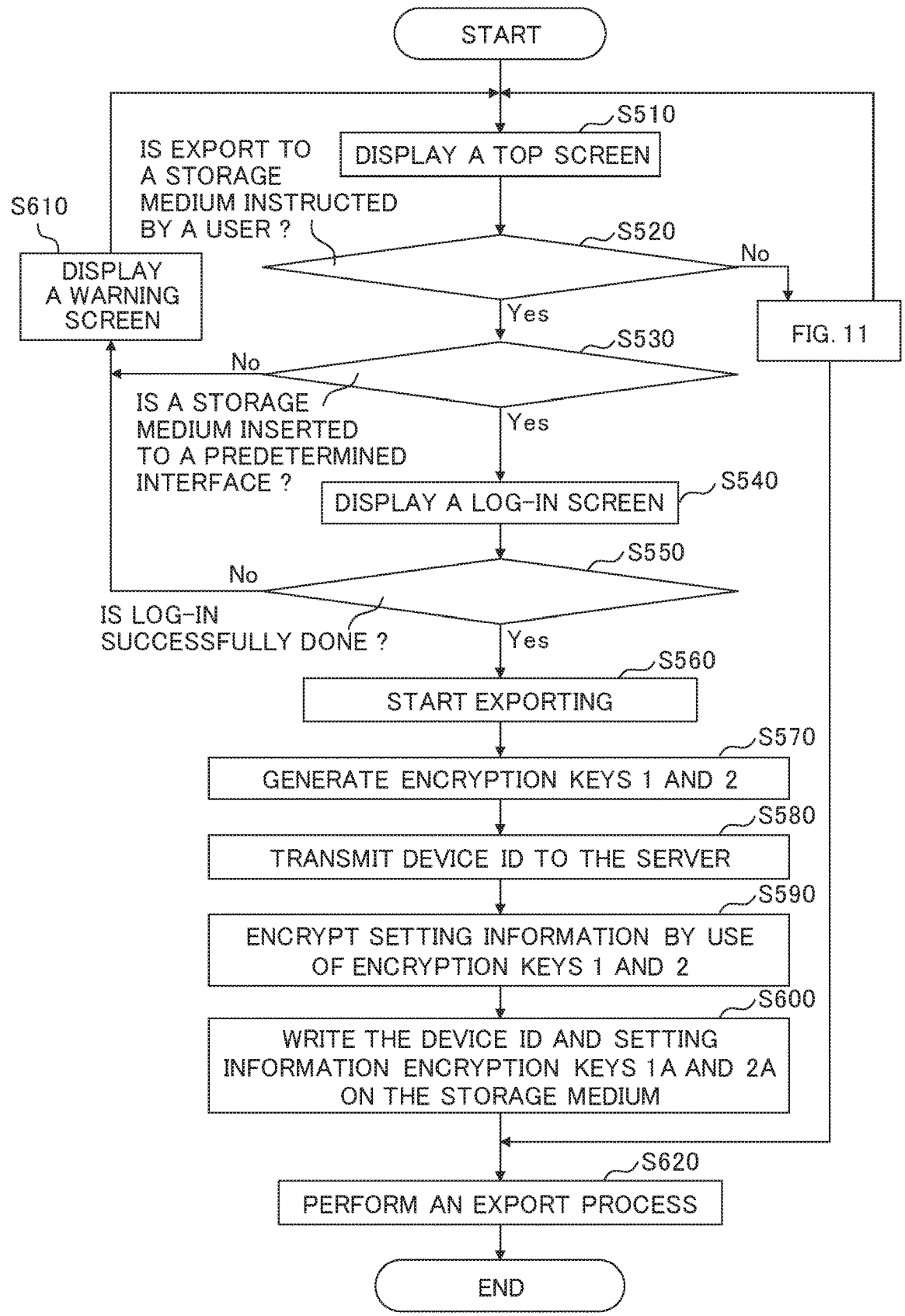
FIG. 18 is an example of a flowchart for explaining an operation of the first electronic device at the time of export in Patterns 1 and 2, according to the second embodiment.

FIG. 18 is an example of a flowchart for explaining an operation of the first electronic device 40-1 at the time of export in Patterns 1 and 2. Furthermore, in the explanation of FIG. 18, the difference from FIG. 11 is mainly explained. First, the processes of Steps S510 through S530 are the same as Steps S10 through S30 of FIG. 11. The subsequent Steps S540 and S550 may be the same as Steps S90 and S100 of FIG. 11 as well.

In the case where the log-in is successfully done (Yes at S550), the first electronic device 40-1 starts exporting (S550).

First, the encryption key generating unit 51 of the first electronic device 40-1 generates an encryption key 1 and an encryption key 2 (S570).

Next, the communication unit 52 of the first electronic device 40-1 transmits the device ID of the first electronic device 40-1 to the server 30 (S580). In the above way, the server 30 generates an encryption key 1B and an encryption key 2B.

Next, the encryption unit 44a of the first electronic device 40-1 encrypts the setting information 8 (S590). The setting item that is specified by the model-specific profile 7 to be encrypted is encrypted by use of the encryption key 1. Further, the entirety of the setting information 8 is encrypted by use of the encryption key 2.

Furthermore, the setting data writing unit 47 of the first electronic device 40-1 writes the device ID, the setting information 8, and an encryption key 1A and an encryption key 2A on the storage medium 9 (S600). Processing in the case of No at the determination of Step S20 is the same as FIG. 11.

<Examples of Screens>

Figure 19A:
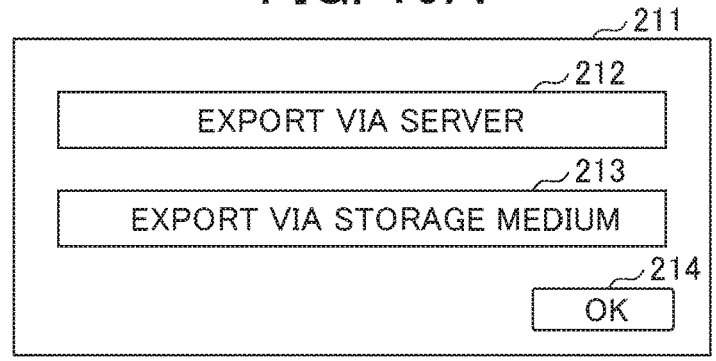
FIG. 19A is an example of a diagram illustrating an example of a screen that the first electronic device displays on the control panel at the time of export, according to the second embodiment.
Figure 19B:
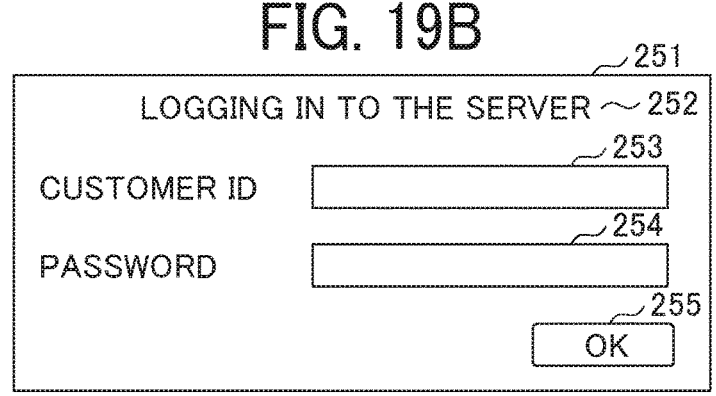
FIG. 19B is an example of a diagram illustrating an example of a screen that the first electronic device displays on the control panel at the time of export, according to the second embodiment.
Figure 19C:
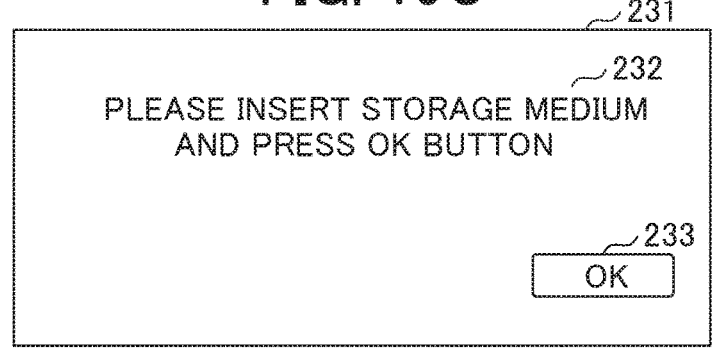
FIG. 19C is an example of a diagram illustrating an example of a screen that the first electronic device displays on the control panel at the time of export, according to the second embodiment.
Figure 19D:
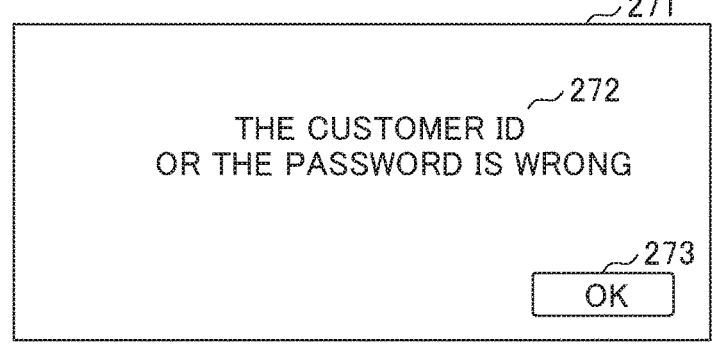
FIG. 19D is an example of a diagram illustrating an example of a screen that the first electronic device displays on the control panel at the time of export, according to the second embodiment.

FIGS. 19A through 19D are diagrams each illustrating an example of a screen that a first electronic device 40-1 displays on the control panel 27 at the time of export. It should be noted that FIG. 19A is the same as FIG. 12A although the screen of FIG. 19A is displayed at Step S510 of FIG. 18. FIG. 19B is the same as FIG. 12E although the screen of FIG. 19B is displayed at Step S540 of FIG. 18. FIG. 19C is the same as FIG. 12C although the screen of FIG. 19C is displayed at Step S610 of FIG. 18. FIG. 19D is the same as FIG. 12G although the screen of FIG. 19D is displayed at Step S610 of FIG. 18.

<Operation Sequence>

Figure 20:
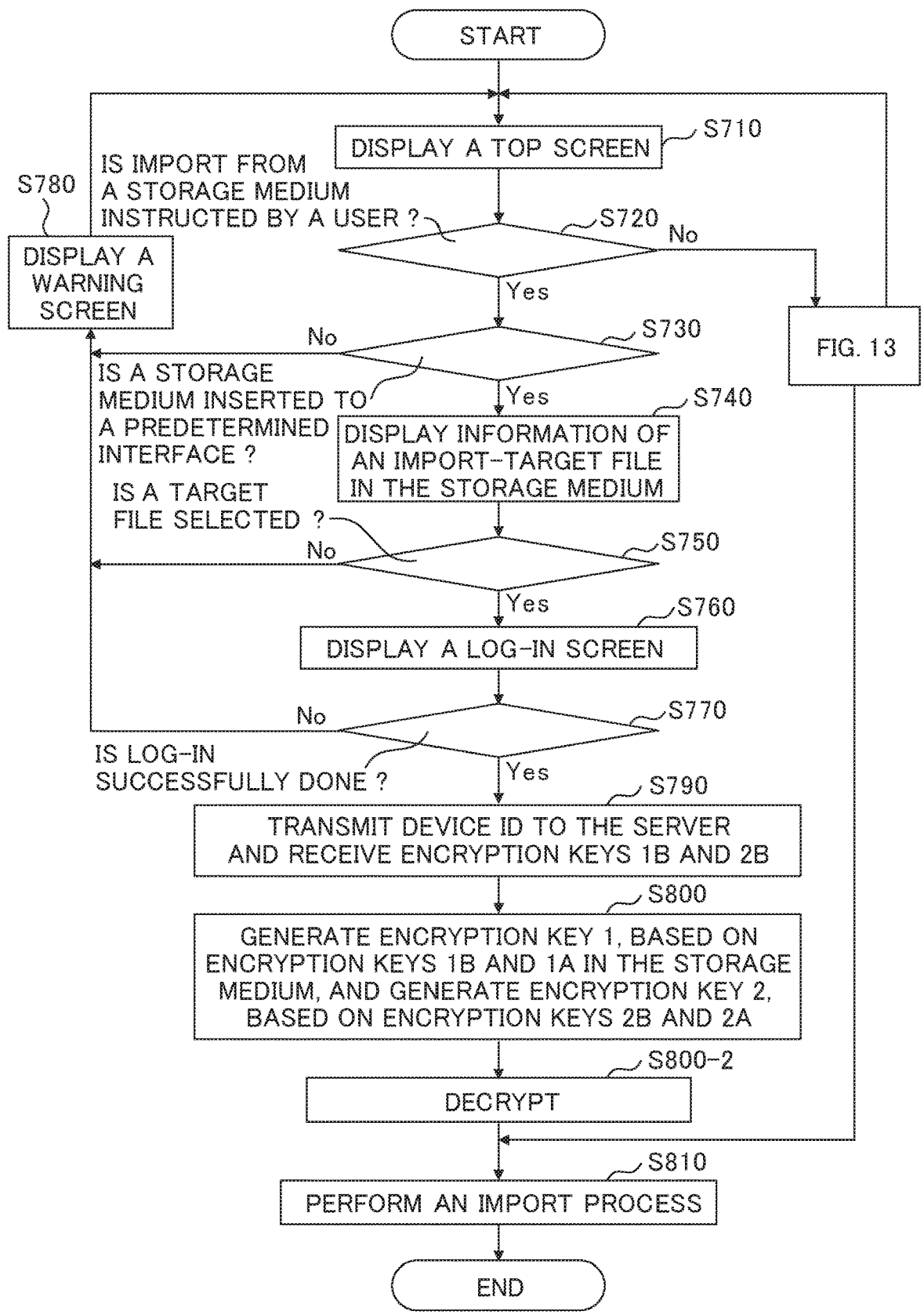
FIG. 20 is an example of a flowchart for explaining an operation of the second electronic device at the time of import in Patterns 1 and 2, according to the second embodiment.

FIG. 20 is an example of a flowchart for explaining an operation of the second electronic device 40-2 at the time of import in Patterns 1 and 2. In the explanation of FIG. 20, the difference from FIG. 13 is explained. First, Steps S710 through S750 may be the same as FIG. 13. The subsequent Steps S760 and S770 are the same as Steps S300 and S310 of FIG. 13.

In the case where the log-in is successfully done (Yes at S770), the communication unit 52 of the second electronic device 40-2 transmits the device ID to the server 30 and receives an encryption key 1B and an encryption key 2B (S790).

Next, the encryption key generating unit 51 generates an encryption key 1, based on an encryption key 1A in the storage medium 9 and the encryption key B received from the server 30. Further, the encryption key generating unit 51 similarly generates an encryption key 2, based on an encryption key 2A and the encryption key 2B (S800). The subsequent processes may be the same as corresponding processes of FIG. 13. Steps S800-2 and S810 may be the same as Steps S370-2 and S390 of FIG. 13.

<Examples of Screens>

Figure 21D:
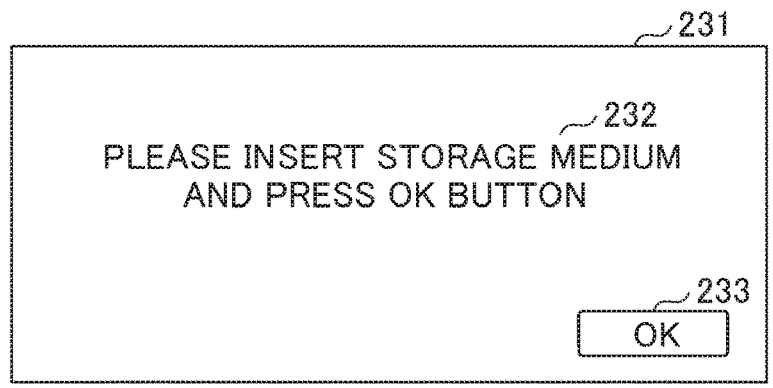
FIG. 21D is a diagram illustrating an example of a screen that the second electronic device displays on the control panel at the time of import, according to the second embodiment.
Figure 21E:
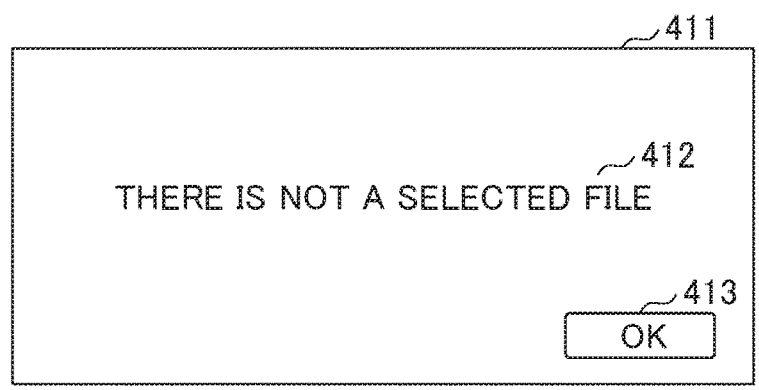
FIG. 21E is a diagram illustrating an example of a screen that the second electronic device displays on the control panel at the time of import, according to the second embodiment.
Figure 21F:
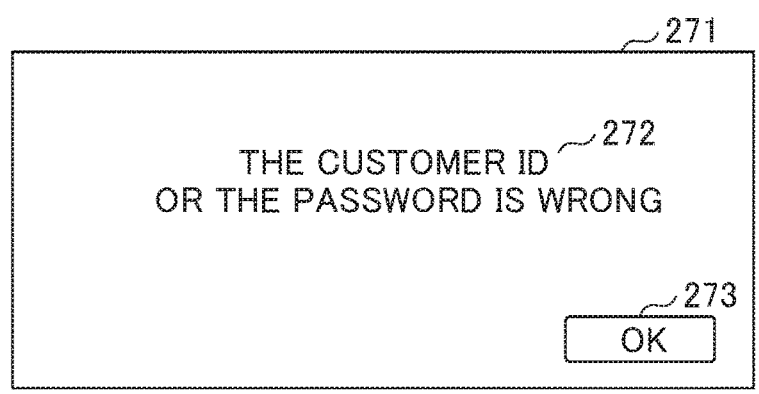
FIG. 21F is a diagram illustrating an example of a screen that the second electronic device displays on the control panel at the time of import, according to the second embodiment.

FIGS. 21A through 21F are diagrams each illustrating an example of a screen that a second electronic device 40-2 displays on the control panel 27 at the time of import. It should be noted that FIG. 21A is the same as FIG. 14A although the screen of FIG. 21A is displayed at Step S710 of FIG. 20. FIG. 21B is the same as FIG. 14B although the screen of FIG. 21B is displayed at Step S740 of FIG. 20. FIG. 21C is the same as FIG. 14G although the screen of FIG. 21C is displayed at Step S760 of FIG. 20. FIG. 21D is the same as FIG. 14D although the screen of FIG. 21D is displayed at Step S780 of FIG. 20. FIG. 21E is the same as FIG. 14E although the screen of FIG. 21E is displayed at Step S780 of FIG. 20. FIG. 21F is the same as FIG. 15B although the screen of FIG. 21F is displayed at Step S780 of FIG. 20.

As described above, in the setting information utilization system 100 according to the present embodiment, in addition to the effect achieved in the first embodiment, the labor for a CE or a user to manage an encryption key 1 and an encryption key 2 can be reduced.

It should be noted that, although Pattern 2 is mainly explained in the present embodiment, application to Pattern 1 is possible as well. As the storage medium 9 is not used in Pattern 1, the first electronic device 40-1 generates an encryption key 1, based on the device ID, and displays an encryption key 1A on the control panel 27, etc., at the time of export. A CE or a user manages the encryption key 1A. Furthermore, the device ID is transmitted to the server 30. At the time of import, the second electronic device 40-2 transmits the device ID of the first electronic device 40-1 to the server 30 and obtains an encryption key 1B. Further, a CE or a user enters the encryption key 1A that a CE or a user manages.

Third Embodiment

In the first embodiment and the second embodiment, the setting information 8, which is encrypted by use of the encryption key 1, is remained being encrypted in the server 30. Therefore, needless to say, a CE or a user cannot view the setting information 8. Further, a CE or a user cannot change the setting information 8. For the above reason, in order to change encrypted setting information 8, it is required for a CE or a user to manually change the setting information 8 after the setting information 8 is imported by the second electronic device 40-2. That is to say, there are many working processes.

Here, in the following embodiment, a setting information utilization system 100 in which a CE or a user is able to change an encrypted setting value in setting information 8 exported to the server 30.

<Overall Operation>

Figure 22:
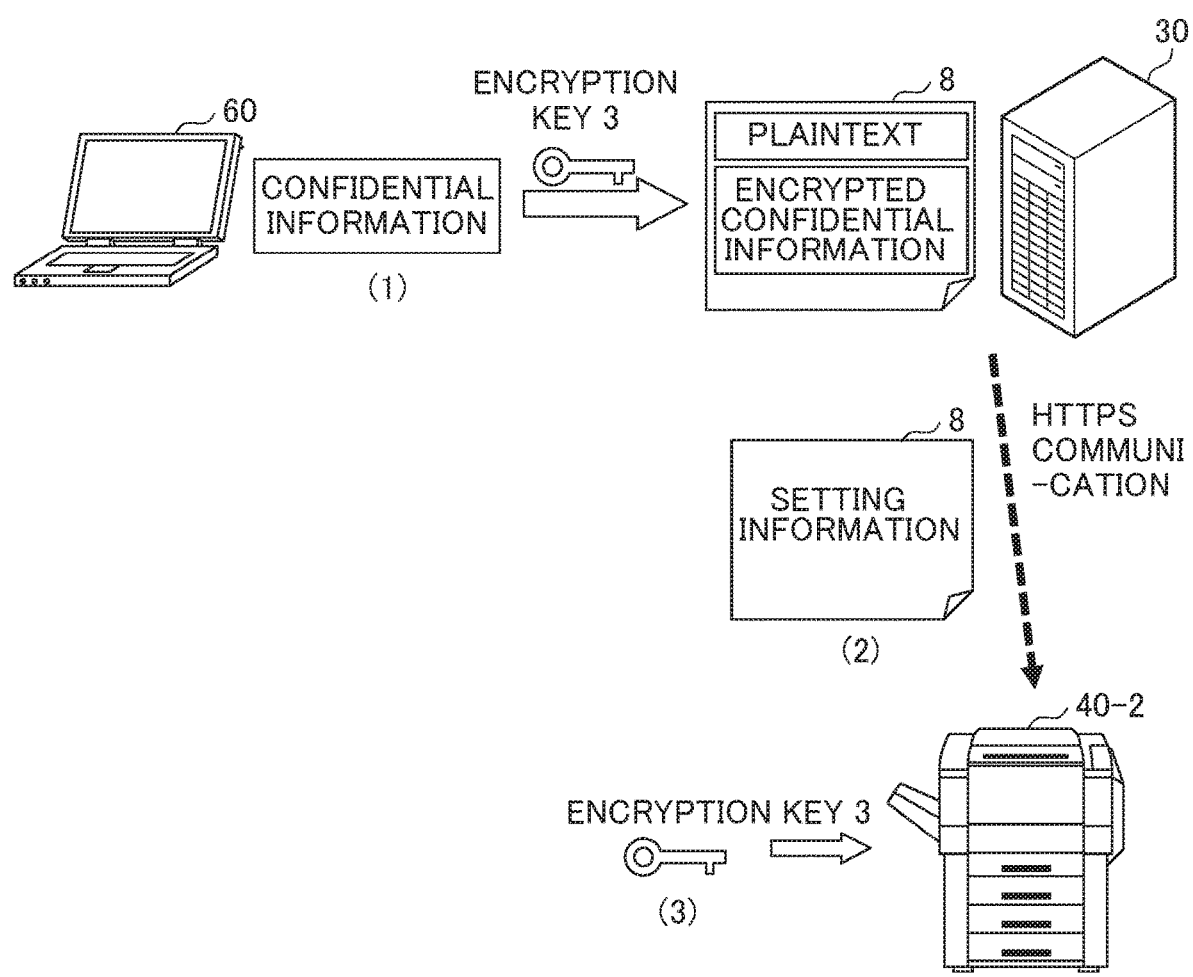
FIG. 22 is an example of a diagram for explaining an overall operation of the setting information utilization system, according to a third embodiment.

FIG. 22 is an example of a diagram for explaining an overall operation of the setting information utilization system 100 according to the present embodiment.

(1) A CE or a user enters, in the setting terminal 60, a changed setting value (hereinafter referred to as confidential information) and an encryption key 3. Further, the setting terminal 60 encrypts the confidential information by use of the encryption key 3 and transmits to the server. In the server 30, changed and unchanged confidential information (e.g., a password, etc.) are stored and the encryption key 3 is not stored.

(2) The second electronic device 40-2 receives setting information 8 from the server 30 through cryptographic communication such as HTTPs communication.

(3) A CE or a user enters the encryption key 3 in the second electronic device 40-2 and the second electronic device 40-2 decrypts the confidential information by use of the encryption key 3. The second electronic device 40-2 integrates the decrypted confidential information and the setting information 8 and sets (i.e., imports) in the storage unit 49.

As the setting value of the imported setting information has been changed with the confidential information, it is not necessary for a CE or a user to customize the second electronic device 40-2. This can reduce time for a CE or a user to manipulate.

<Functions>

Figure 23:
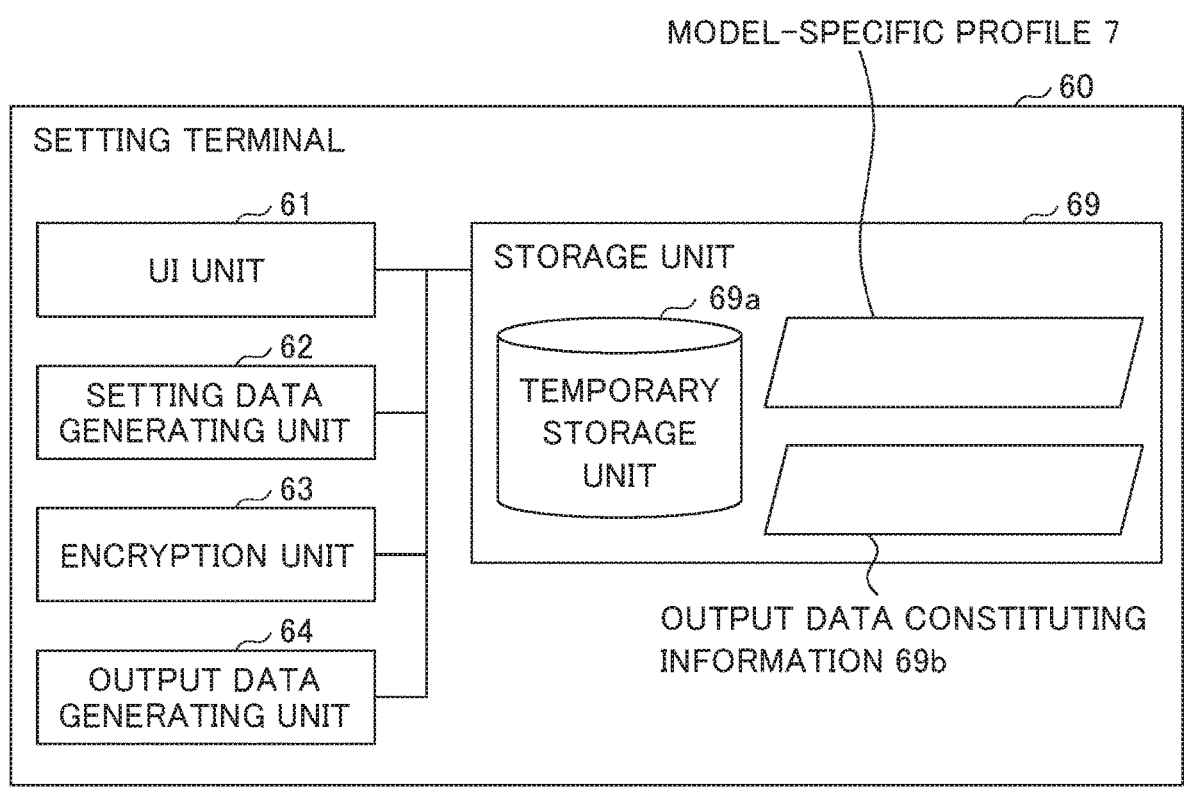
FIG. 23 is an example of a functional block diagram illustrating functions of a setting terminal according to the third embodiment of the present invention.

FIG. 23 is an example of a functional block diagram illustrating functions of the setting terminal 60 using blocks. The setting terminal 60 includes a UI unit 61, a setting data generating unit 62, an encryption unit 63, and an output data generating unit 64. Each functional unit included in the setting terminal 60 is a function that is implemented when any one of the configuration elements illustrated in FIG. 4 operates on the basis of an instruction from the CPU 301 in accordance with a program retrieved from the HDD 307 onto the RAM 303. Such a program as described above is delivered from a server for delivering programs or is stored in a storage medium for distribution.

The UI unit 61 displays various types of screens on the display device 306 and accepts operation by a CE or a user on the setting terminal 60. The setting data generating unit 62 performs a process relating to change of confidential information entered by a CE or a user. The encryption unit 63 encrypts confidential information by use of an encryption key 3 that is entered by a CE or a user. The output data generating unit 64 associates setting information 8 with confidential information, so as to generate output data.

Furthermore, the setting terminal 60 includes a storage unit 69. The storage unit 69 is any desired memory for storing information, which is implemented by at least one of the HDD 307, the RAM 303, and the ROM 302 in the setting terminal 60. In the storage unit 69, a temporary storage unit 69a, a model-specific profile 7, an output data constituting information 69b, etc., are stored. The temporary storage unit 69a is any desired memory for temporarily storing information, such as the RAM 13. The output data constituting information 69b is information for associating an encryption area with setting information.

<Re: Encryption Area>

Figure 24:
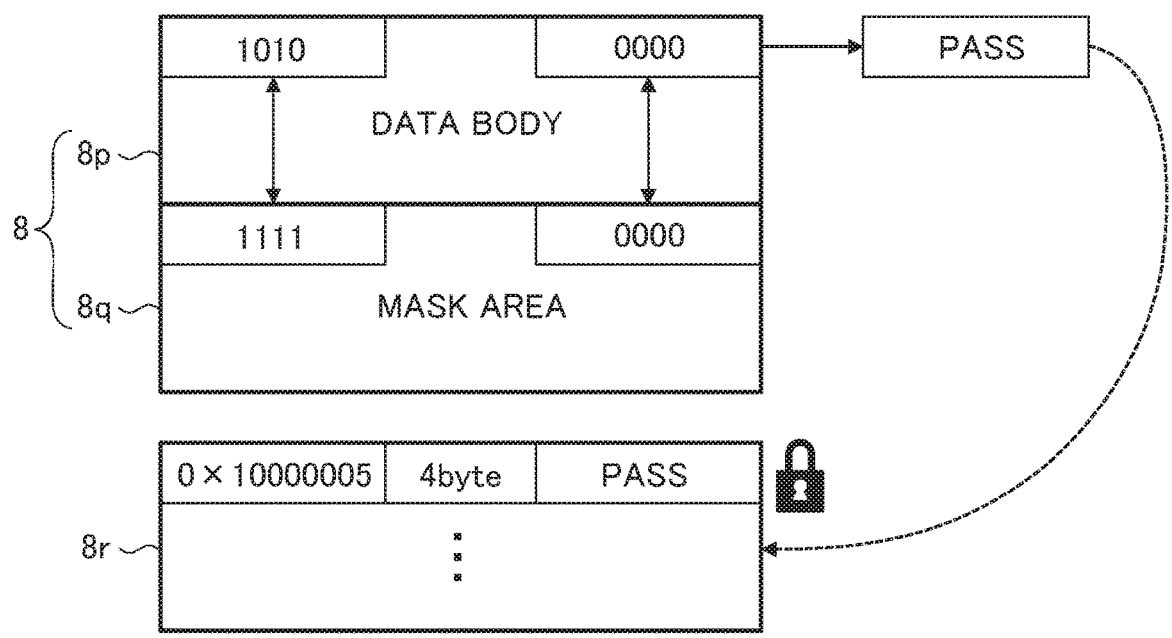
FIG. 24 is an example of a diagram for schematically explaining encryption of a setting item, according to the third embodiment.

With reference to FIG. 24, encryption of a highly confidential setting item is explained. FIG. 24 is an example of a diagram for schematically explaining encryption of a setting item. Setting information 8 includes a data body 8p and a mask area 8q. Furthermore, as an example of a setting item to be encrypted, setting value "PASS" is included in setting information 8. "PASS" is a password. For encrypting a password, the setting data obtaining unit 44 copies "PASS" to an encryption area 8r and the original area of the data body 8p is embedded with "0"s.

The mask area 8q is prepared, corresponding to area of the data body 8p. For example, the mask area 8q may have an area in the same size as the data body 8p. Alternatively, one bit may correspond to a byte of the data body 8p. The mask area 8q indicates whether a setting item in a corresponding area is valid. In a case of "1", it is indicated that the setting value of a corresponding setting item is valid. In a case of "0", it is indicated that the setting value of a corresponding setting item is invalid. That is to say, the mask area 8q is constituted with "1"s only, in the original state. Then, "0" is set, corresponding to a setting item to be encrypted.

In the encryption area 8r, length (four bytes in the diagram) and a setting value (i.e., PASS) are stored, corresponding to preference ID. Module ID may be included. However, as an encryption area 8r is prepared on a per module basis, module ID is omitted in FIG. 24. As a CE or a user enters an encryption key 1 in a first electronic device 40-1, the first electronic device 40-1 encrypts the encryption area 8r.

The encryption area 8r is transmitted to a second electronic device 40-2, which is the transition destination, without being decrypted in the server 30. As described above, an encryption-target setting value in setting information 8 is copied to an encryption area 8r and the original setting value is replaced with "0", and therefore leaking is prevented.

The second electronic device 40-2 receives the setting information 8, the encryption area 8r is decrypted by use of an encryption key 1 entered by a CE or a user. Next, a setting value in the data body 8p whose mask area 8q is "1" is extracted directly from the data body 8p. A setting value in the data body 8p whose mask area 8q is "0" is not obtained from the data body 8p and, based on the preference ID of the setting value, the setting value in the encryption area 8r is obtained.

In the present embodiment, change of the encryption area 8r is allowed and, as described below, an additional encryption area is generated.

It should be noted that each of "1", which indicates that a setting value is valid, and "0", which indicates that a setting value is invalid, may be a predetermined sign (e.g., a character, a number, etc.), as far as the predetermined sign is indicative of being valid or invalid.

<Change of an Encryption Area>

Figure 25:
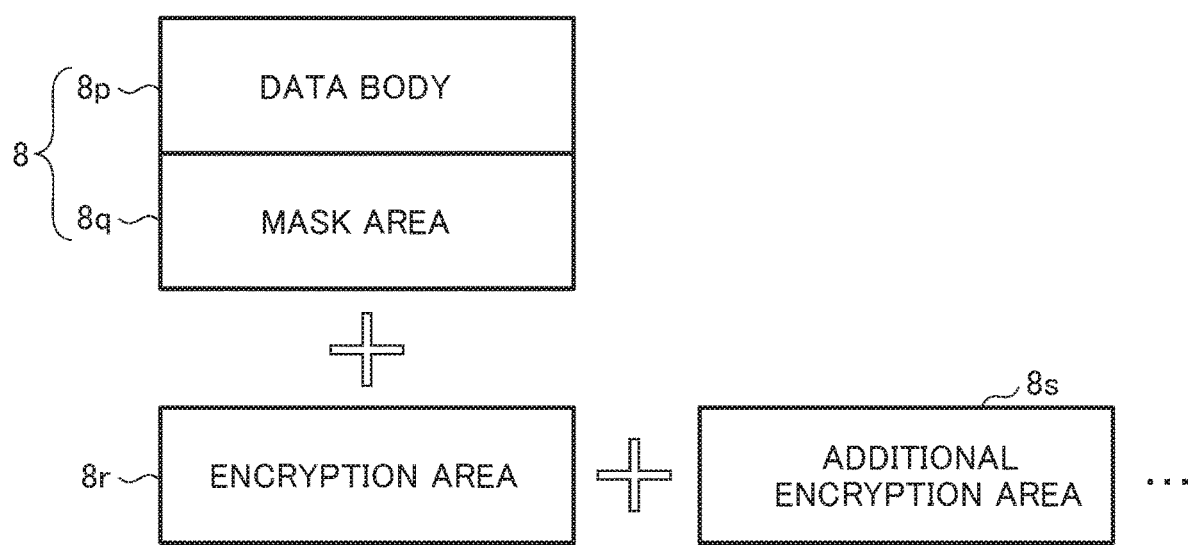
FIG. 25 is an example of a diagram for schematically explaining change of encryption area, according to the third embodiment.

FIG. 25 is an example of a diagram for schematically explaining change of an encryption area 8r. As explained in FIG. 24, to setting information 8, an encryption area 8r is additionally assigned. In a case where confidential information is changed as described in the present embodiment, an additional encryption area 8s is additionally assigned. An encryption area 8r and an additional encryption area 8s are associated with each other and stored in a server 30. In an additional encryption area 8s, at least one changed setting value (i.e., confidential information) is included.

TABLE 7-1

| DEVICE ID | FILE OF SETTING INFORMATION | TIMESTAMP | COMMENT |
|---|---|---|---|
| 3F55-11111 | .../3F55-11111/setting.cab | 2017/04/18/10:10 | A COMPANY HUMAN RESOURCES DIVISION |
| 3F32-22222 | .../3F32-22222/setting.cab | 2017/04/18/12:35 | A COMPANY INTELLECTUAL PROPERTY DIVISION |
| . | . | . | . |
| . | . | . | . |
| . | . | . | . |

TABLE 7-2

| ENCRYPTION AREA | ADDITIONAL ENCRYPTION AREA | THE NUMBER OF CUSTOMIZATION DATA |
|---|---|---|
| secret.cab | secret_plus1.cab | 1 |
| secret.cab | secret_plus1.cab secret_plus2.cab | 2 |
| . | . | . |
| . | . | . |

Table 7-1 and Table 7-2 schematically illustrate a setting information management table that is stored in the setting information storage unit 38. In Table 7-1 and Table 7-2, in addition to items of Table 3, items of an encryption area, an additional encryption area, and the number of customization data are included. An encryption area and an additional encryption area are files of encrypted setting values. The number of customization data is the number of additional encryption areas 8s. In a case where there is the same profile ID in an encryption area 8r and an additional encryption area 8s, the setting value is overwritten with the setting value of the additional encryption area 8s. Furthermore, in a case where there are multiple additional encryption areas 8s, the setting value is overwritten with a new additional encryption area 8s. Therefore, there is not technical limitation to the number of customization data.

Furthermore, in a case where multiple setting items are changed, the setting terminal 60 may: (i) generate one additional encryption area 8s with multiple setting items; (ii) generate an additional encryption area 8s on a per setting item basis; or (iii) generate an additional encryption area 8s on a per change basis.

In the case of (i), a CE or a user may only set one encryption key 3. The number (in the above case, 1) of additional encryption areas 8s is registered in the setting information storage unit 38. In the case of (ii), it is necessary for a CE or a user to set an encryption key 3 on a per setting item basis. The number (in the above case, the number of items) of additional encryption areas 8s is registered in the setting information storage unit 38. In the case of (iii), it is necessary for a CE or a user to set an encryption key 3 on a per change basis. In the above case, the number (in the above case, the number of times of customization) of additional encryption areas 8s is registered in the setting information storage unit 38. In other words, it is necessary for a CE or a user to set an encryption key 3 on a per additional encryption area 8s basis.

For example, a click by a user on an execution button of a screen for changing an encryption area is counted as one change, A second electronic device 40-2 obtains an encryption area 8r, all additional encryption areas 8s, and the number of customization data in the setting information storage unit 38, at the time of obtaining a list of importable setting information 8. The decryption unit 45a of the second electronic device 40-2 determines the number of encryption keys 3 to be entered, based on the number of customization data, and displays a screen to request for entry of each encryption key 3.

The decryption unit 45a decrypts all additional encryption areas 8s by use of entered encryption keys 3, so as to overwrite setting values of the additional encryption areas 8s on setting information 8 in an order from the oldest to the newest. In a case where there are setting values with the same profile ID, the setting value 8 is overwritten with a setting value whose timing of change is relatively new.

<Operation Sequence>

Figure 26:
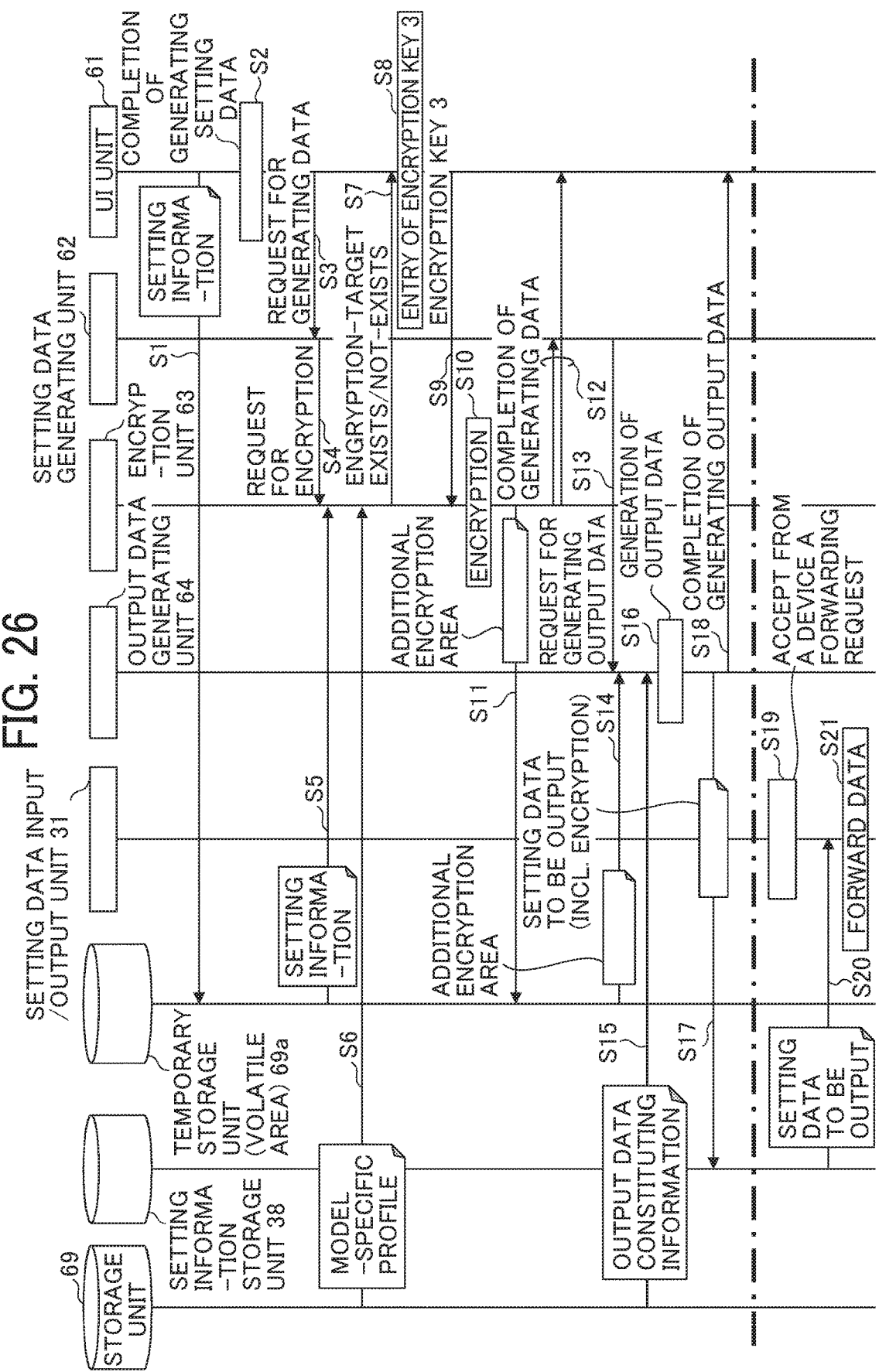
FIG. 26 is an example of a sequence diagram for explaining an overall operation of the setting information utilization system, in which change of encrypted setting information is allowed, according to the third embodiment.

FIG. 26 is an example of a sequence diagram for explaining an overall operation of the setting information utilization system 100, in which change of encrypted setting information 8 is allowed. The processes of FIG. 26 are performed, for example, after a CE or a user transmits setting information 8 to the server 30.

S1: The UI unit 61 obtains setting information 8 from the server 30 and stores the setting information 8 in the temporary storage unit 69a.

S2: When a CE or a user provides an instruction of "generating setting information of an electronic device and generating data to be imported to a device" to the setting terminal 60, the UI unit 61 of the setting terminal 60 accepts the instruction and generates at least one confidential information (e.g., a password), etc. Alternatively, confidential information is entered by a CE or a user.

S3: The UI unit 61 transmits a request for generating data to the setting data generating unit 62.

S4: The setting data generating unit 62 transmits a request for encryption to the encryption unit 63.

S5: The encryption unit 63 obtains setting information 8 from the temporary storage unit 69a.

S6: The encryption unit 63 obtains the model-specific profile 7 from the storage unit 69.

S7: The encryption unit 63 refers to the model-specific profile 7 for each setting item in the setting information 8, so as to determine whether a setting item is encrypted. Further, the encryption unit 63 notifies the UI unit 61 as to whether the setting item is an encryption-target.

S8: The UI unit 61 generates a screen for accepting change of a setting item to be encrypted, in order for a CE or a user to enter an encryption key 3. The UI unit 61 accepts entry of an encryption key 3.

S9: The UI unit 61 transmits the encryption key 3 to the encryption unit 63.

S10: The encryption unit 63 encrypts the confidential information by use of the encryption key 3. In other words, the encryption unit 63 encrypts an additional encryption area 8s.

S11: The encryption unit 63 saves the additional encryption area 8s in the temporary storage unit 69a.

S12: The encryption unit 63 notifies the setting data setting unit 62 and the UI unit 61 of completion of saving.

S13: The setting data generating unit 62 requests the output data generating unit 64 for generating data.

S14: The output data generating unit 64 obtains, from the temporary storage unit 69a, the setting information 8 (incl, an encryption area 8r) and the additional encryption area 8s.

S15: The output data generating unit 64 obtains output data constituting information 69b from the storage unit 69.

S16: The output data generating unit 64 refers to the output data constituting information 69b and generates output data. In other words, output data in which the setting information 8 (incl, the encryption area 8r) and the additional encryption area 8s are associated with the setting information 8 is generated.

S17: The output data generating unit 64 saves the setting information 8, which includes the confidential information, in the setting information storage unit 38 of the server 30.

S18: The output data generating unit 64 notifies the UI unit 61 of completion of generation.

Following the above is the processing at the time of import.

S19: The setting data input/output unit 31 of the server 30 accepts a forwarding request from the second electronic device 40-2.

S20: The setting data input/output unit 31 of the server 30 obtains, from the setting information storage unit 38, setting data to be output (i.e., the setting information at S17).

S21: The setting data input/output unit 31 transmits the setting information 8, which includes the confidential information, to the second electronic device 40-2.

Furthermore, after generation of the output data, the setting information 8 and the additional encryption area 8s stored in the temporary storage unit 69a are deleted by the output data generating unit 64. Furthermore, in a case where the encryption unit 63 determines that there is not a setting item to be encrypted, the encryption unit 63 notifies the setting data generating unit 62 that there is not a setting item to be encrypted. Then, the sequence is transferred to the process for generating output data.

Figure 27:
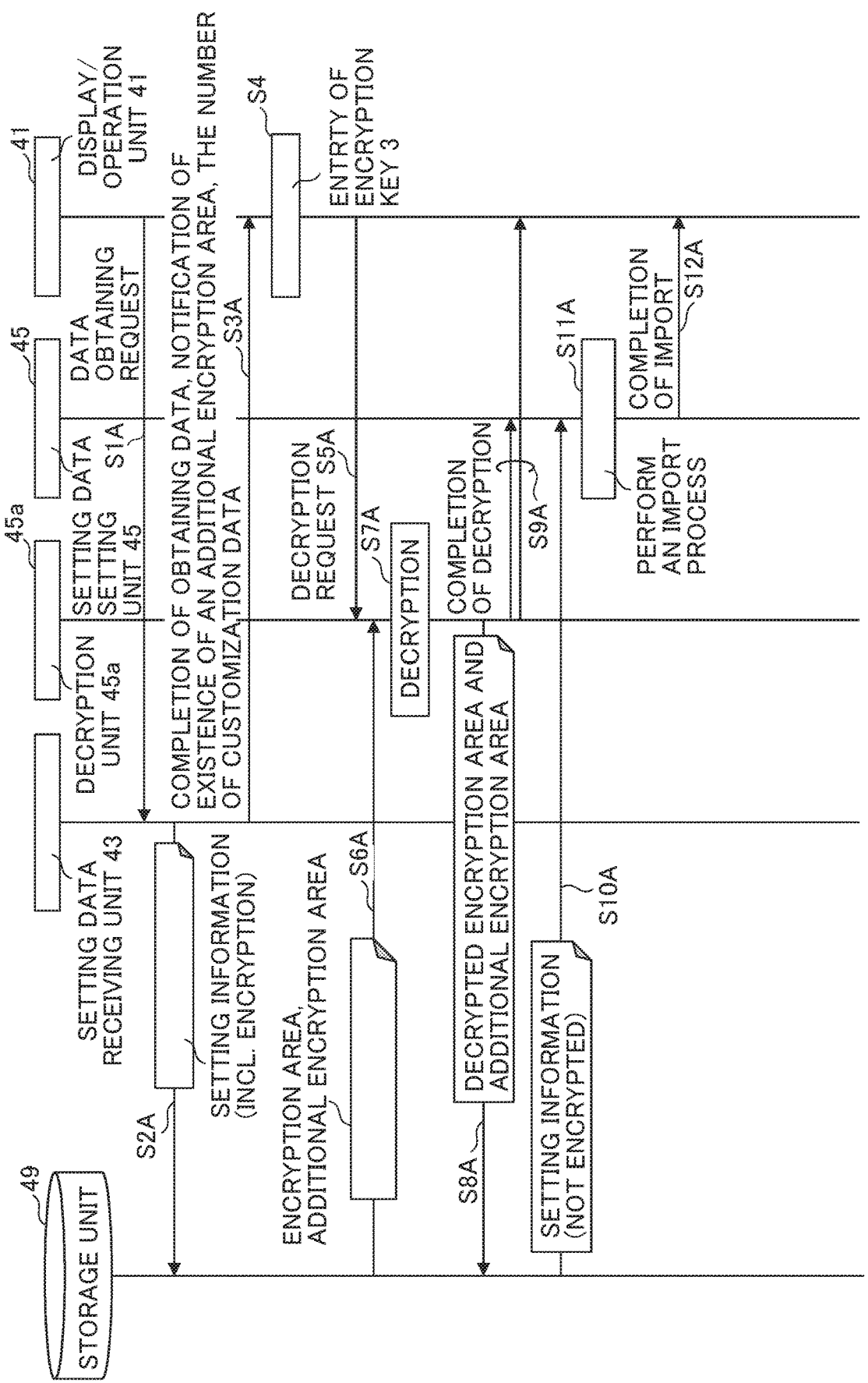
FIG. 27 is an example of a sequence diagram for illustrating a process performed by the second electronic device at the time of importing confidential information, according to the third embodiment.

FIG. 27 is an example of a sequence diagram illustrating a process performed by a second electronic device 40-2 at the time of importing confidential information. As a CE or a user logs in to the server 30, exported setting information 8 can be specified.

S1A: When a CE or a user manipulates a second electronic device 40-2 to import setting information 8, the display/operation unit 41 of the second electronic device 40-2 accepts the manipulation. It should be noted that a CE or a user may specify setting information 8 to be imported by logging in, in the same way as the second embodiment. The display/operation unit 41 transmits a data obtaining request to the setting data receiving unit 43.

S2A: The setting data receiving unit 43 receives the setting information 8 from the setting information storage unit 38 of the server 30 and temporarily stores the setting information 8 in the storage unit 49. The setting information 8 includes an encryption area 8r and at least one additional encryption area 8s.

S3A: The setting data receiving unit 43 notifies the display/operation unit 41 of completion of obtainment, existence of an encryption area 8r, and the number of additional encryption areas 8s (as well as the number of customization data).

S4A: A CE or a user enters an encryption key 3. The display/operation unit 41 of the second electronic device 40-2 accepts entry of the encryption key 3. Here, the display/operation unit 41 accepts entry of an encryption key 1 and encryption keys 3 in the number of customization data.

S5A: The display/operation unit 41 transmits a decryption request to the decryption unit 45a along with the encryption key 1 and the encryption keys 3.

S6A: The decryption unit 45a obtains the encryption area 8r and the additional encryption area 8s from the storage unit 49.

S7A: The encryption unit 45a decrypts the encryption area 8r by use of the encryption key 1 and decrypts all additional encryption areas 8s by use of the encryption keys 3, each of which is entered in association with an additional encryption area 8s.

S8A: The decryption unit 45a saves the decrypted encryption area 8r and additional encryption areas 8s in the storage unit 49.

S9A: The decryption unit 45a notifies the setting data setting unit 45 and the display/operation unit 41 of completion of decryption.

S10A: The setting data setting unit 45 obtains, from the storage unit 49, the setting information 8, the encryption area 8r, and the additional encryption areas 8s.

S11A: The setting data setting unit 45 performs an import process. That is to say, the encryption area 8r is integrated into the setting information 8 and the additional encryption areas are integrated into the setting information 8 in an order from the oldest. A writing location may be specified by use of preference ID. Then, the setting information 8 is set in the storage unit 49 via the basic function unit 46.

S12A: The setting data setting unit 45 transmits, to the display/operation unit 41, completion of import.

As explained above, in the setting information utilization system 100 of the present embodiment, a user interface for an encrypted setting item is provided and a changed setting value (i.e., confidential information) is stored in the server 30 in an encrypted form. At the time of import by a second electronic device 40-2, a CE or a user enters an encryption key 3 and the second electronic device 40-2 decrypts and sets the changed setting value. This decreases the labor of a CE or a user to change a setting value after import.

<Other Application Examples>

The present invention is not at all limited to the above embodiments and therefore various variations and replacement may be added within a range not departing from the scope of the present invention.

For example, in the present embodiments, encryption is performed different numbers of times, depending on whether to export to the server 30 or to the storage medium 9. However, an algorithm or strength of encryption may be different. That is to say, in a case of exporting to a storage medium 9, an algorithm that is more difficult in decoding, compared to a case of exporting to the server 30, may be adopted. Alternatively, strength of encryption may be enhanced.

Furthermore, in one or more of the embodiments, encryption is performed twice in a case of exporting to a storage medium 9 and is performed once in a case of exporting to a server 30. However, encryption may be performed three times or more and twice or more, respectively.

Furthermore, in the configuration examples of FIG. 5. FIG. 6, FIG. 17, FIG. 23, etc., processing by the electronic devices 40 and the server 30 are divided, based on main functions, for ease of understanding of the processing. The present invention is not limited by how each processing unit is divided into or the name of each processing unit. The processing by the electronic devices 40 and the server 30 may be further divided into processing units in a larger number in accordance with processing contents. Furthermore, it is possible to divide the processing such that a processing unit includes broader processing.

Furthermore, functions of a server 30 may divisionally exist in multiple servers. Further, each table in a server 30 may exist in any location on a network N where a server 30 is able to access to.

The storage unit 49 of the first electronic device 40-1 is an example of a first storage unit. The setting data obtaining unit 44 of the first electronic device 40-1 is an example of a setting information obtaining unit. The display/operation unit 41 of the first electronic device 40-1 is an example of a first accepting unit. The encryption unit 44a is an example of an encryption unit. The setting data transmitting unit 42 or the setting data writing unit 47 is an example of a saving unit. The setting data receiving unit 43 or the setting data reading unit 48 of the second electronic device 40-2 is an example of an obtaining unit. The display/operation unit 41 of the second electronic device 40-2 is an example of a second accepting unit. The decryption unit 45a is an example of a decryption unit. The setting data setting unit 45 of the second electronic device 40-2 is an example of a setting information setting unit. The storage unit 49 of the second electronic device 40-2 is an example of a second storage unit.

The encryption key generating unit 51 of the first electronic device 40-1 is an example of a first encryption key generating unit. The communication unit 52 of the first electronic device 40-1 is an example of a first communication unit. The communication unit 52 of the second electronic device 40-2 is an example of a second communication unit. The encryption key generating unit 51 of the second electronic device 40-2 is an example of a second encryption key generating unit.

The encryption key 1A is an example of a first encryption key generating information A. The encryption key 1B is an example of a first encryption key generating information B. The encryption key 2A is an example of a second encryption key generating information A. The encryption key 2B is an example of a second encryption key generating information B. The encryption key 1 is an example of a first encryption key. The encryption key 2 is an example of a second encryption key. The encryption key 3 is an example of a third encryption key.

The UI unit 61 is an example of an input accepting unit. The encryption unit 63 is an example of a second encryption unit. The output data generating unit 64 is an example of a transmitting unit.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

In one embodiment, the present invention may reside in an electronic device communicable with an information processing apparatus via a network, the electronic device including circuitry to: obtain, from a portable storage medium, setting information relating to setting of the electronic device; accept selection of a saving destination of the setting information; encrypt the setting information in an encryption method determined in accordance with the saving destination; and store the encrypted setting information in the saving destination.

In one embodiment, the present invention may reside in an electronic device communicable with an information processing apparatus via a network, the electronic device comprising circuitry to: obtain setting information from a saving destination; accept selection of the saving destination of the setting information; decrypt the setting information in a decryption method corresponding to an encryption method determined in accordance with the saving destination; and store the decrypted setting information in a second memory.

The invention claimed is:

1. A system for utilizing setting information, comprising: a first electronic device and a second electronic device communicably connected to an information processing apparatus via a network, wherein the first electronic device includes first circuitry configured to: obtain, from a first memory, setting information relating to setting of the first electronic device; accept selection of a saving destination of the setting information; encrypt the setting information in an encryption method determined in accordance with the saving destination; and store the encrypted setting information in the saving destination, wherein the saving destination is the information processing apparatus or a portable storage medium, wherein the encryption method for encrypting the setting information by the first circuitry differs based on whether the saving destination is the information processing apparatus or the portable storage medium, and wherein the decryption method for decrypting the setting information by the second circuitry varies in strength based on whether the saving destination is the information processing apparatus or the portable storage medium and wherein the second electronic device includes second circuitry configured to: obtain the encrypted setting information from the saving destination; accept selection of the saving destination of the encrypted setting information; decrypt the encrypted setting information in a decryption method corresponding to the encryption method determined in accordance with the saving destination; and store the decrypted setting information in a second memory of the second electronic device and update operational settings of the second electronic device according to the stored decrypted setting information.

2. The system according to claim 1, wherein the first circuitry changes, in accordance with the saving destination, a number of times that the setting information is encrypted, and wherein the second circuitry changes, in accordance with the saving destination, a number of times that the setting information is decrypted.

3. The system according to claim 1, wherein, when the saving destination is the information processing apparatus, the first circuitry encrypts a first setting item of the setting information using a first encryption key while not encrypting other setting items of the setting information other than the first setting item, the first setting item being one or more of the setting information, and transmits the setting information including the first setting item encrypted using the first encryption key to the information processing apparatus, and wherein, when the saving destination is the portable storage medium, the first circuitry encrypts the first setting item using the first encryption key, encrypts, using a second encryption key, an entirety of the setting information including the first setting item encrypted using the first encryption key, and writes the setting information encrypted using the second encryption key on the portable storage medium.

4. The system according to claim 3, wherein, when the saving destination is the information processing apparatus, the second circuitry decrypts, using the first encryption key, the first setting item of the setting information obtained from the information processing apparatus, and wherein, when the saving destination is the portable storage medium, the second circuitry decrypts, using the second encryption key, the entirety of the setting information obtained from the portable storage medium and decrypts, using the first encryption key, the first setting item of the setting information.

5. The system according to claim 3, wherein, when the accepted saving destination is the information processing apparatus, the first circuitry accepts entry of the first encryption key, and wherein, when the accepted saving destination is the portable storage medium, the first circuitry accepts entry of the first encryption key and the second encryption key.

6. The system according to claim 4, wherein, when the accepted saving destination is the information processing apparatus, the second circuitry accepts entry of the first encryption key, and wherein, when the accepted saving destination is the portable storage medium, the second circuitry accepts entry of the first encryption key and the second encryption key.

7. The system according to claim 3, wherein, when the accepted saving destination is the portable storage medium, the first circuitry of the first electronic device generates the first encryption key and the second encryption key, generates first encryption key generating information based on the first encryption key, and generates second encryption key generating information based on the second encryption key, transmits identification information of the first electronic device to the information processing apparatus, and stores, in the portable storage medium, the first encryption key generating information and the second encryption key generating information each generated by the first electronic device and the identification information of the first electronic device, and wherein, when the accepted saving destination is the portable storage medium, the second circuitry of the second electronic device transmits, to the information processing apparatus, the identification information of the first electronic device stored in the portable storage medium, receives, from the information processing apparatus, first encryption key generating information and second encryption key generating information, each of which is generated by the information processing apparatus based on the identification information of the first electronic device, generates the first encryption key, based on the first encryption key generating information generated by the first electronic device and the first encryption key generating information generated by the information processing apparatus, and generates the second encryption key, based on the second encryption key generating information generated by the first electronic device and the second encryption key generating information generated by the information processing apparatus.

8. The system according to claim 3 further comprising a terminal configured to communicate with the information processing apparatus, wherein the terminal includes third circuitry configured to: accept entry of a setting value of a second setting item of the setting information and a third encryption key, the second setting item being one or more items of the setting information different from the first setting item; encrypt the setting value of the second setting item using the third encryption key; and transmit, to the information processing apparatus, the encrypted setting value of the second setting item, and wherein the information processing apparatus stores the setting value of the first setting item encrypted using the first encryption key together with the setting value of the second setting item encrypted using the third encryption key, and in response to a request from the second electronic device for the setting information, transmits, to the second electronic device, the setting value of the first setting item encrypted using the first encryption key and the setting value of the second setting item encrypted using the third encryption key.

9. The system according to claim 8, wherein the information processing apparatus stores information indicating a number of times that the setting value has been encrypted using the third encryption key and transmits, to the second electronic device, the setting value of the first setting item encrypted using the first encryption key and the setting value of the second setting item encrypted using the third encryption key, together with the setting information and the information indicating the number of times, and wherein the second circuitry of the as many times as the number of times, decrypts, using the first encryption key, the setting value of the first setting item encrypted using the first encryption key, decrypts, using the third encryption key, the setting value of the second setting item encrypted using the third encryption key, and integrates the setting value decrypted using the first encryption key and the setting value decrypted using the third encryption key into the setting information.

10. A method for utilizing setting information, performed by a system including a first electronic device and a second electronic device communicably connected to an information processing apparatus via a network, the method comprising: with the first electronic device, obtaining, from a first memory, setting information relating to setting of the first electronic device; with the first electronic device, accepting selection of a saving destination of the setting information the with the first electronic device, encrypting the setting information in an encryption method determined in accordance with the saving destination; with the first electronic device, storing the encrypted setting information in the saving destination; with the second electronic device,
wherein the saving destination is the information processing apparatus or a portable storage medium, wherein the encryption method for encrypting the setting information by the first electronic device differs based on whether the saving destination is the information processing apparatus or the portable storage medium, and wherein the decryption method for decrypting the setting information by the second electronic device varies in strength based on whether the saving destination is the information processing apparatus or the portable storage medium obtaining the encrypted setting information from the saving destination; with the second electronic device, accepting selection of the saving destination of the encrypted setting information; with the second electronic device, decrypting the encrypted setting information in a decryption method corresponding to the encryption method determined in accordance with the saving destination; and with the second electronic device, storing the decrypted setting information in a second memory of the second electronic device and updating operational settings of the second electronic device according to the stored decrypted setting information.

11. The system according to claim 1, wherein the first electronic device and the second electronic device are multifunction printers.

12. The method according to claim 10, further comprising: with the first electronic device, changing a number of times that the setting information is encrypted in accordance with the saving destination; and with the second electronic device, changing a number of times that the setting information is decrypted in accordance with the saving destination.

13. The method according to claim 10, wherein, when the saving destination is the information processing apparatus, the step of encrypting using the first electronic device includes: encrypting a first setting item of the setting information using a first encryption key while not encrypting other setting items of the setting information other than the first setting item, the first setting item being one or more of the setting information, and the step of storing using the first electronic device includes: transmitting the setting information including the first setting item encrypted using the first encryption key to the information processing apparatus, and wherein, when the saving destination is the portable storage medium, the step of encrypting using the first electronic device includes: encrypting the first setting item using the first encryption key; and encrypting, using a second encryption key, an entirety of the setting information including the first setting item encrypted using the first encryption key; and the step of storing using the first electronic device includes: writing the setting information encrypted using the second encryption key on the portable storage medium.

14. The method according to claim 13, wherein, when the saving destination is the information processing apparatus, the step of decrypting using the second electronic device includes: decrypting, using the first encryption key, the first setting item of the setting information obtained from the information processing apparatus, and wherein, when the saving destination is the portable storage medium, the step of decrypting using the second electronic device includes: decrypting, using the second encryption key, the entirety of the setting information obtained from the portable storage medium; and decrypting, using the first encryption key, the first setting item of the setting information.

15. The method according to claim 13, wherein, when the accepted saving destination is the information processing apparatus, the method further comprising accepting entry of the first encryption key at the first electronic device, and wherein, when the accepted saving destination is the portable storage medium, the method further comprising accepting entry of the first encryption key and the second encryption key at the first electronic device.

16. The method according to claim 14, wherein, when the accepted saving destination is the information processing apparatus, the method further comprising accepting entry of the first encryption key at the second electronic device, and wherein, when the accepted saving destination is the portable storage medium, the method further comprising accepting entry of the first encryption key and the second encryption key at the second electronic device.

17. The method according to claim 13, wherein, when the accepted saving destination is the portable storage medium, the method performed by the first electronic device further comprises: generating the first encryption key and the second encryption key;

generating first encryption key generating information based on the first encryption key;

generating second encryption key generating information based on the second encryption key;

transmitting identification information of the first electronic device to the information processing apparatus; and storing, in the portable storage medium, the first encryption key generating information and the second encryption key generating information each generated by the first electronic device and the identification information of the first electronic device, and wherein, when the accepted saving destination is the portable storage medium, the method performed by the second electronic device further comprises: transmitting, to the information processing apparatus, the identification information of the first electronic device stored in the portable storage medium; receiving, from the information processing apparatus, first encryption key generating information and second encryption key generating information, each of which is generated by the information processing apparatus based on the identification information of the first electronic device; generating the first encryption key, based on the first encryption key generating information generated by the first electronic device and the first encryption key generating information generated by the information processing apparatus; and generating the second encryption key, based on the second encryption key generating information generated by the first electronic device and the second encryption key generating information generated by the information processing apparatus.

18. The method according to claim 13, further comprising: with a terminal communicable with the information processing apparatus, accepting entry of a setting value of a second setting item of the setting information and a third encryption key, the second setting item being one or more items of the setting information different from the first setting item; with the terminal, encrypting the setting value of the second setting item using the third encryption key; transmitting, from the terminal to the information processing apparatus, the encrypted setting value of the second setting item; with the information processing apparatus, storing the setting value of the first setting item encrypted using the first encryption key together with the setting value of the second setting item encrypted using the third encryption key; and in response to a request from the second electronic device for the setting information, transmitting, from the information processing apparatus to the second electronic device, the setting value of the first setting item encrypted using the first encryption key and the setting value of the second setting item encrypted using the third encryption key.

19. The method according to claim 18, further comprising: with the information processing apparatus, storing information indicating a number of times that the setting value has been encrypted using the third encryption key; transmitting, from the information processing apparatus to the second electronic device, the setting value of the first setting item encrypted using the first encryption key and the setting value of the second setting item encrypted using the third encryption key, together with the setting information and the information indicating the number of times; with the second electronic device, accepting entry of the first encryption key and the third encryption key as many times as the number of times; with the second electronic device, decrypting, using the first encryption key, the setting value of the first setting item encrypted using the first encryption key; with the second electronic device, decrypting, using the third encryption key, the setting value of the second setting item encrypted using the third encryption key; and with the second electronic device, integrating the setting value decrypted using the first encryption key and the setting value decrypted using the third encryption key into the setting information.

* * * * *